United States Patent
Hecht et al.

(10) Patent No.: US 8,976,997 B1
(45) Date of Patent: Mar. 10, 2015

(54) TRANSPARENT PARAMETRIC EMITTER

(71) Applicant: Turtle Beach Corporation, Poway, CA (US)

(72) Inventors: David S. Hecht, San Diego, CA (US); Brian A. Kappus, San Diego, CA (US); Elwood G. Norris, Poway, CA (US); Mark W. Norris, Poway, CA (US)

(73) Assignee: Turtle Beach Corporation, Poway, CA (US)

( * ) Notice: Subject to any disclaimer, the term of this patent is extended or adjusted under 35 U.S.C. 154(b) by 0 days.

(21) Appl. No.: 14/330,794

(22) Filed: Jul. 14, 2014

(51) Int. Cl.
*H04R 25/00* (2006.01)

(52) U.S. Cl.
USPC .......................... 381/388; 381/333; 381/152

(58) Field of Classification Search
USPC .................... 381/306, 332–333, 152, 388
See application file for complete search history.

(56) References Cited

U.S. PATENT DOCUMENTS

| | | | | |
|---|---|---|---|---|
| 6,427,017 B1 * | 7/2002 | Toki | | 381/388 |
| 7,570,771 B2 * | 8/2009 | Whitwell et al. | | 381/152 |
| 7,657,042 B2 * | 2/2010 | Miyata | | 381/152 |
| 7,769,191 B2 * | 8/2010 | Lee et al. | | 381/152 |
| 8,666,106 B2 * | 3/2014 | Konno et al. | | 381/332 |

* cited by examiner

*Primary Examiner* — Suhan Ni
(74) *Attorney, Agent, or Firm* — Sheppard Mullin Richter & Hampton LLP

(57) ABSTRACT

A transparent ultrasonic emitter includes a first transparent base layer; a transparent conductor disposed on the first transparent base layer; a second transparent base layer; and a partially open transparent conductive layer disposed on the second transparent base layer between the first and second transparent base layers, wherein the partially open conductive layer comprises conductive portions, the conductive portions having a thickness and being arranged to define one or more open volumes adjacent the second transparent base layer.

29 Claims, 26 Drawing Sheets

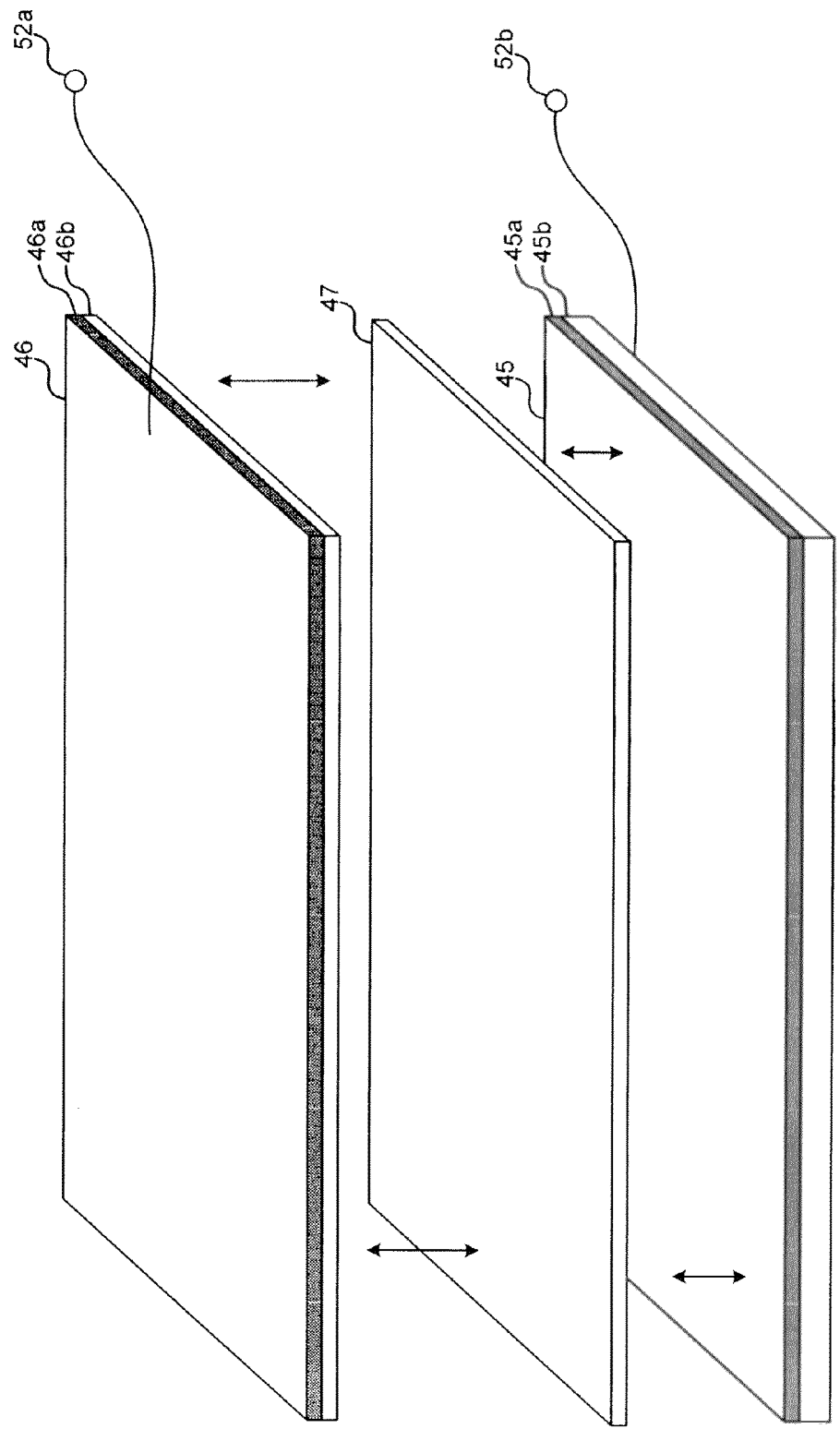

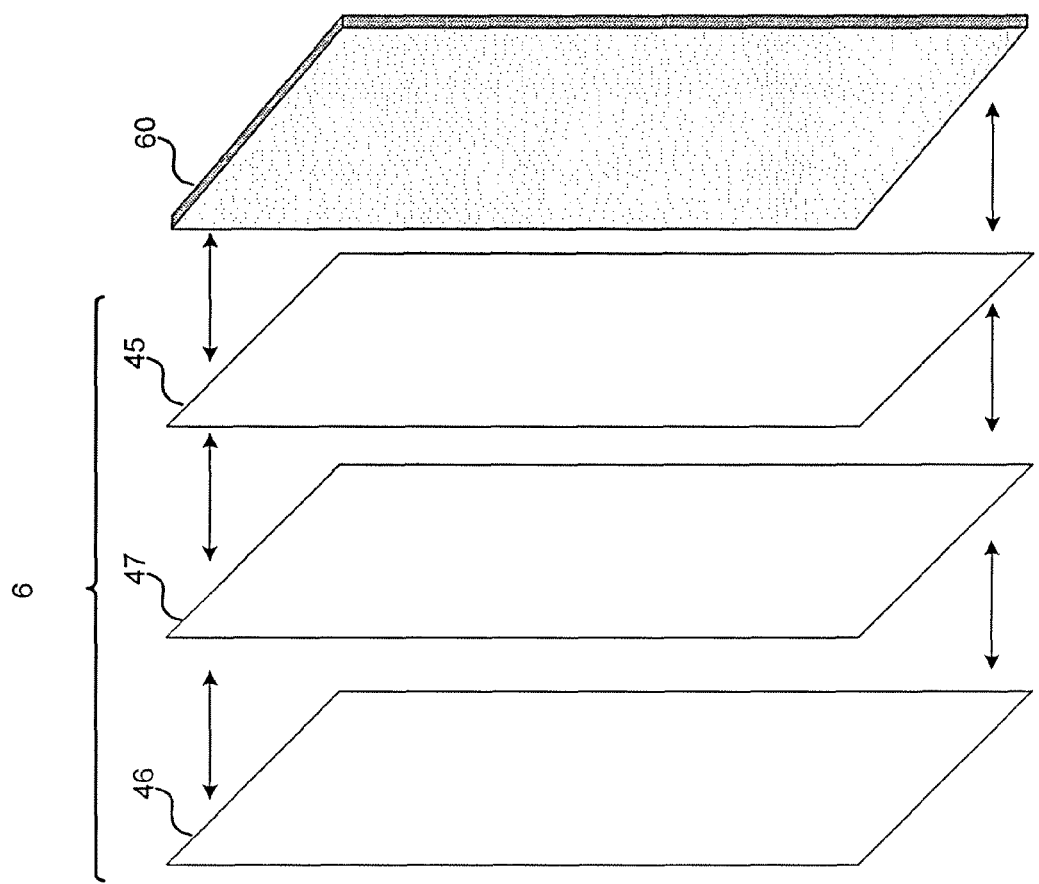

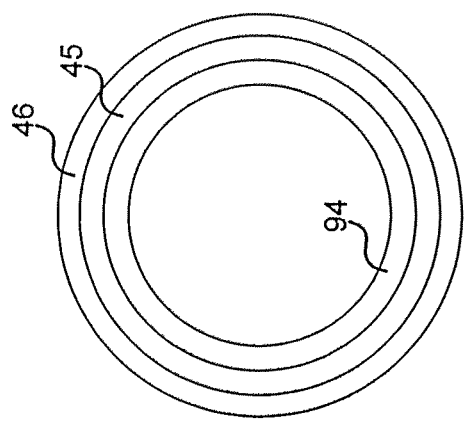
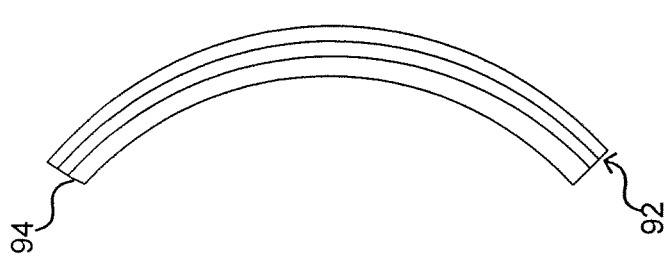
Fig. 14B
Fig. 14A

TRANSPARENT PARAMETRIC EMITTER

TECHNICAL FIELD

The present disclosure relates generally to parametric speakers. More particularly, some embodiments relate to a transparent ultrasonic emitter.

BACKGROUND OF THE INVENTION

Parametric sound is a fundamentally new class of audio, which relies on a non-linear mixing of an audio signal with an ultrasonic carrier. One of the key enablers for this technology is a high-amplitude, efficient ultrasonic source, which is referred to here as an emitter or transducer. Ultrasonic emitters can be created through a variety of different fundamental mechanisms, such as piezoelectric, electrostatic, and thermoacoustic, to name a few. Electrostatic emitters are generally capacitive devices consisting of two conductive faces with an air gap, where at least one of the conductive faces has a texture that is critical to the functionality of the emitter.

Non-linear transduction results from the introduction of sufficiently intense, audio-modulated ultrasonic signals into an air column. Self-demodulation, or down-conversion, occurs along the air column resulting in the production of an audible acoustic signal. This process occurs because of the known physical principle that when two sound waves with different frequencies are radiated simultaneously in the same medium, a modulated waveform including the sum and difference of the two frequencies is produced by the non-linear (parametric) interaction of the two sound waves. When the two original sound waves are ultrasonic waves and the difference between them is selected to be an audio frequency, an audible sound can be generated by the parametric interaction.

Parametric audio reproduction systems produce sound through the heterodyning of two acoustic signals in a non-linear process that occurs in a medium such as air. The acoustic signals are typically in the ultrasound frequency range. The non-linearity of the medium results in acoustic signals produced by the medium that are the sum and difference of the acoustic signals. Thus, two ultrasound signals that are separated in frequency can result in a difference tone that is within the 60 Hz to 20,000 Hz range of human hearing.

SUMMARY

Embodiments of the technology described herein include an ultrasonic audio speaker system, comprising an ultrasonic emitter. In various embodiments, the emitter is a transparent emitter configured with a sufficient degree of transparency so that it can be positioned over, or implemented as, a screen for a display of a content device. The transparent ultrasonic audio speaker in various embodiments includes an emitter and a driver. The emitter can include first and second transparent sheets each with a conductive region. For example, the first and second sheets can be made of glass or other like material, and each sheet can provided with a conductive layer deposited on a surface thereof.

In another embodiment, the emitter can include a first transparent base layer; a transparent conductor disposed on the first transparent base layer; a second transparent base layer; and a partially open transparent conductive layer disposed on the second transparent base layer between the first and second transparent base layers, wherein the partially open conductive layer comprises conductive portions, the conductive portions having a thickness and being arranged to define one or more open volumes adjacent the second transparent base layer.

The emitter can further include an insulating layer disposed between the second transparent base layer and the partially open conductive layer, and wherein the open volumes defined by the conductive portions are between the second transparent base layer and the insulating layer. The open volumes defined by the conductive portions can further be defined by a surface of the second transparent base layer and a facing surface of the first transparent base layer.

The wire diameter and spacing of the conductive portions of the partially open conductive layer may be selected such that the partially open conductive layer has a transparency in the visible spectrum of greater than 80%. In various embodiments, the ultrasonic audio speaker has a resonant frequency and wherein the resonant frequency is defined by the quantity and volume of the open volumes in the partially open conductive layer.

In further embodiments, the conductive portions of the partially open conductive layer comprises a plurality of sections of conductive wire arranged in an intersecting pattern defining open areas there between. The conductive portions of the partially open conductive layer may comprise a textured conductive member having a plurality of conductive ridges arranged so as to create openings there between. The conductive ridges may have a plurality of peaks defining valleys in the conductive ridges therebetween.

In some embodiments, the first and second transparent layers, the transparent conductor can be selected such that a transmittance of the emitter is greater than 80% in the visible spectrum.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the accompanying figures. The drawings are provided for purposes of illustration only and merely depict typical or example embodiments of the invention. These drawings are provided to facilitate the reader's understanding of the systems and methods described herein, and shall not be considered limiting of the breadth, scope, or applicability of the claimed invention.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 3B is an exploded view diagram illustrating an example emitter in accordance with one embodiment of the technology described herein.

FIG. 5, which comprises

FIG. 11 is an exploded view diagram of an emitter and an accompanying content device with which it is incorporated in accordance with one embodiment of the technology described herein.

FIGS. 14a and 15a are diagrams illustrating an example of an emitter in an arcuate configuration.

FIGS. 14b and 15b are diagrams illustrating an example of an emitter in a cylindrical configuration.

Figure 1:
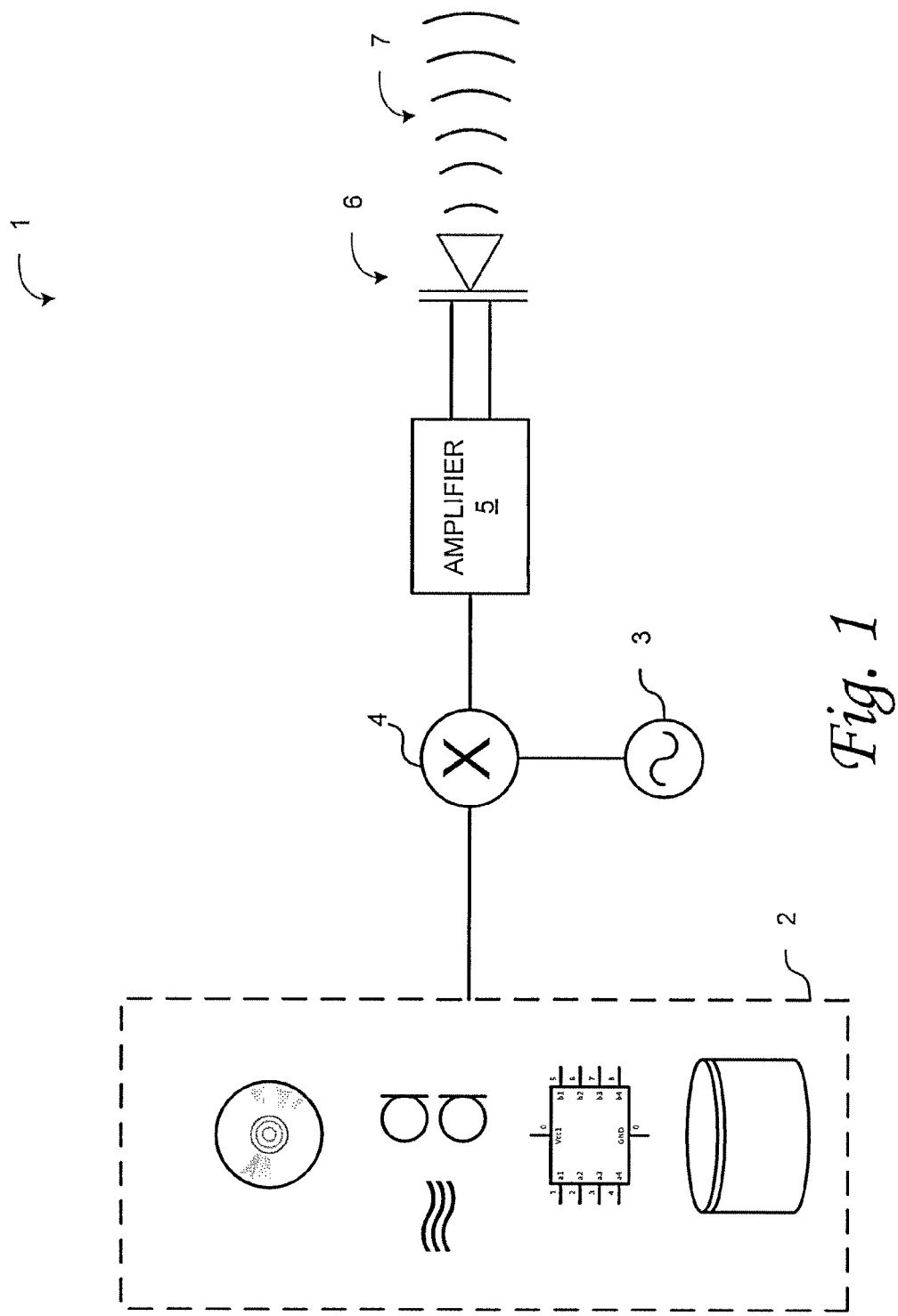
FIG. 1 is a diagram illustrating an ultrasonic sound system suitable for use with the emitter technology described herein.

The figures are not intended to be exhaustive or to limit the invention to the precise form disclosed. It should be understood that the invention can be practiced with modification and alteration, and that the invention be limited only by the claims and the equivalents thereof.

DESCRIPTION

Embodiments of the systems and methods described herein provide a HyperSonic Sound (HSS) audio system or other ultrasonic audio system for a variety of different applications. Certain embodiments provide an ultrasonic emitter for ultrasonic carrier audio applications. Preferably, the ultrasonic emitter is made using conductive layers or regions on glass or other transparent material, separated by a transparent insulating layer, so that the emitter has a high degree of transparency.

Accordingly, in some embodiments, the emitter is sufficiently transparent such that it can be positioned on or in front of the display screen of a content playback or display device to provide directional audio to a user of the device. In other embodiments, the emitter can be provided in place of the display screen of a content playback or display device. Content display devices such as, for example, laptops, tablet computers, computers and other computing devices, smartphones, televisions, PDAs, mobile devices, mp3 and video players, digital cameras, navigation systems, point-of-sale terminals and other content display devices are becoming smaller and lighter and are being designed with power saving features in mind.

Because of the shrinking size of such content devices, there is less room available in the device packaging to include audio speakers. Conventional audio speakers generally operate better with a resonating chamber, and also resonate at frequencies requiring a relatively large degree of movement from the speaker cone. Accordingly, sufficient space is required in the device packaging to accommodate such speakers. This can become particularly challenging with contemporary content devices in which displays, and hence the devices, are becoming increasing thin. Also contributing to this challenge is the fact that contemporary content devices are often designed such that the front face of the device is primarily occupied by the display screen, which is surrounded by only a small, decorative border. Thus, it has become increasingly more difficult to achieve desired audio output with conventional acoustic audio speakers given these dimensional constraints. Moreover, conventional acoustic audio speakers tend to not be highly directional. Therefore, it is difficult to 'direct' conventional audio signals exclusively to an intended listener location.

Therefore, in some embodiments, one or more transparent parametric emitters are disposed on the face of the device to allow parametric audio content to be provided to the device user(s). Further, in some embodiments, a transparent emitter can be positioned over part or all of the content device's display. In still further embodiments, a transparent emitter can be provided and used as (e.g., in place of) the display's protective cover (i.e., glass facing). Accordingly, in various embodiments, the transparent emitter is manufactured with materials providing sufficient light transmittance in the visible spectrum to allow satisfactory viewing by a user(s). For example, in some embodiments the light transmittance of the emitter in the visible spectrum is 50% or greater. In further embodiments, the light transmittance of the emitter in the visible spectrum is 60% or greater. In still further embodiments, the light transmittance of the emitter in the visible spectrum is 70% or greater. In still further embodiments, the light transmittance of the emitter in the visible spectrum is 80% or greater. As a further example, the light transmittance of the emitter in the visible spectrum is in the range of 70-90%. As yet another example, the light transmittance of the emitter in the visible spectrum is in the range of 75-85%. As still another example, the light transmittance of the emitter in the visible spectrum is in the range of 80-95%.

FIG. 1 is a diagram illustrating an ultrasonic sound system suitable for use with the systems and methods described herein. In this exemplary ultrasonic audio system 1, audio content from an audio source 2, such as, for example, a microphone, memory, a data storage device, streaming media source, CD player, DVD player, content display device, or other audio source is received. The audio content may be decoded and converted from digital to analog form, depending on the source. The audio content received by the audio system 1 is modulated onto an ultrasonic carrier of frequency f1, using a modulator. The modulator typically includes a local oscillator 3 to generate the ultrasonic carrier signal, and multiplier 4 to multiply the audio signal by the carrier signal. The resultant signal is a double- or single-sideband signal with a carrier at frequency f1. In some embodiments, signal is a parametric ultrasonic wave or an HSS signal. In most cases, the modulation scheme used is amplitude modulation, or AM. AM can be achieved by multiplying the ultrasonic carrier by the information-carrying signal, which in this case is the audio signal. The spectrum of the modulated signal has two sidebands, an upper and a lower side band, which are generally symmetric with respect to the carrier frequency, and the carrier itself.

The modulated ultrasonic signal is provided to the emitter or transducer 6, which launches the ultrasonic wave into the air creating ultrasonic wave 7. When played back through the transducer at a sufficiently high sound pressure level, due to nonlinear behavior of the air through which it is 'played' or transmitted, the carrier in the signal mixes with the sideband(s) to demodulate the signal and reproduce the audio content. This is sometimes referred to as self-demodulation. Thus, even for single-sideband implementations, the carrier is included with the launched signal so that self-demodulation can take place. Although the system illustrated in FIG. 1 uses a single transducer to launch a single channel of audio content, one of ordinary skill in the art after reading this description will understand how multiple mixers, amplifiers and transducers can be used to transmit multiple channels of audio using ultrasonic carriers.

Figure 2:
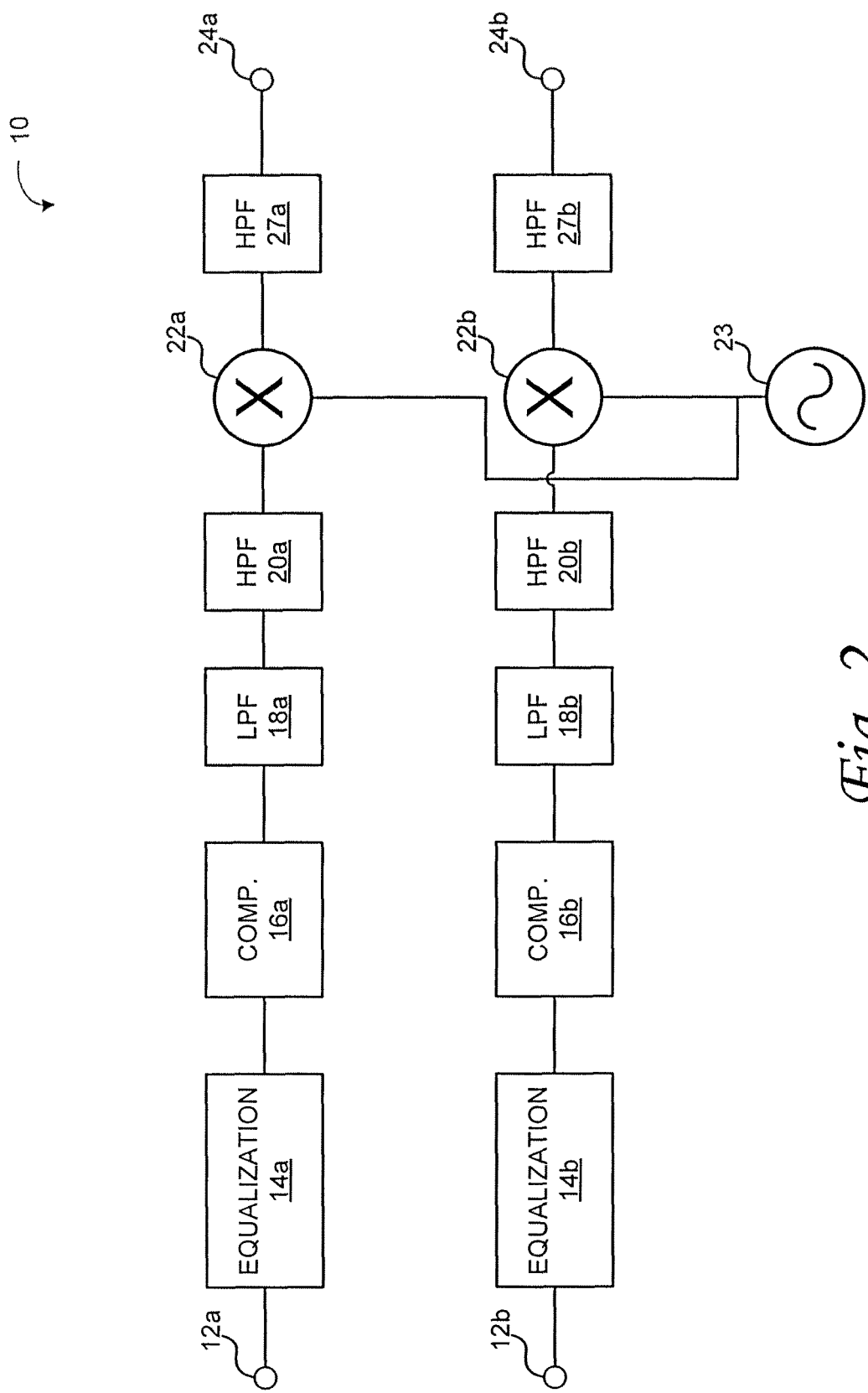
FIG. 2 is a diagram illustrating another example of a signal processing system that is suitable for use with the emitter technology described herein.

One example of a signal processing system 10 that is suitable for use with the technology described herein is illustrated schematically in FIG. 2. In this embodiment, various processing circuits or components are illustrated in the order (relative to the processing path of the signal) in which they are arranged according to one implementation. It is to be understood that the components of the processing circuit can vary, as can the order in which the input signal is processed by each circuit or component. Also, depending upon the embodiment, the signal processing system 10 can include more or fewer components or circuits than those shown.

The example shown in FIG. 1 is optimized for use in processing two input and output channels (e.g., a "stereo" signal), with various components or circuits including substantially matching components for each channel of the signal. It will be understood by one of ordinary skill in the art after reading this description that the audio system 1 can be implemented using a single channel (e.g., a "monaural" or "mono" signal), two channels (e.g., "stereo") (as illustrated in FIG. 2), or a greater number of channels.

Referring now to FIG. 2, the example signal processing system 10 can include audio inputs that can correspond to left 12a and right 12b channels of an audio input signal. Equalizing networks 14a, 14b can be included to provide equalization of the signal. The equalization networks can, for example, boost or suppress predetermined frequencies or frequency ranges to increase the benefit provided naturally by the emitter/inductor combination of the parametric emitter assembly.

After the audio signals are equalized, compressor circuits 16a, 16b can be included to compress the dynamic range of the incoming signal, effectively raising the amplitude of certain portions of the incoming signals and lowering the amplitude of certain other portions of the incoming signals. More particularly, compressor circuits 16a, 16b can be included to narrow the range of audio amplitudes. In one aspect, the compressors lessen the peak-to-peak amplitude of the input signals by a ratio of not less than about 2:1. Adjusting the input signals to a narrower range of amplitude can be done to minimize distortion, which is characteristic of the limited dynamic range of this class of modulation systems. In other embodiments, the equalizing networks 14a, 14b can be provided after compressor circuits 16a, 16b, to equalize the signals after compression.

Low pass filter circuits 18a, 18b can be included to provide a cutoff of high portions of the signal, and high pass filter circuits 20a, 20b providing a cutoff of low portions of the audio signals. In one exemplary embodiment, low pass filter circuits 18a, 18b are used to cut signals higher than about 15-20 kHz, and high pass filter circuits 20a, 20b are used to cut signals lower than about 20-200 Hz.

The high pass filter circuits 20a, 20b can be configured to eliminate low frequencies that, after modulation, would result in deviation of carrier frequency (e.g., those portions of the modulated signal that are closest to the carrier frequency). Also, some low frequencies are difficult for the system to reproduce efficiently and as a result, much energy can be wasted trying to reproduce these frequencies. Therefore, high pass filter circuits 20a, 20b can be configured to cut out these frequencies.

Low pass filter circuits 18a, 18b can be configured to eliminate higher frequencies that, after modulation, could result in the creation of an audible beat signal with the carrier. By way of example, if a low pass filter cuts frequencies above 15 kHz, and the carrier frequency is approximately 44 kHz, the difference signal will not be lower than around 29 kHz, which is still outside of the audible range for humans. However, if frequencies as high as 25 kHz were allowed to pass the filter circuit, the difference signal generated could be in the range of 19 kHz, which is within the range of human hearing.

In the example signal processing system 10, after passing through the low pass and high pass filters, the audio signals are modulated by modulators 22a, 22b. Modulators 22a, 22b, mix or combine the audio signals with a carrier signal generated by oscillator 23. For example, in some embodiments a single oscillator (which in one embodiment is driven at a selected frequency of 40 kHz to 50 kHz, which range corresponds to readily available crystals that can be used in the oscillator) is used to drive both modulators 22a, 22b. By utilizing a single oscillator for multiple modulators, an identical carrier frequency is provided to multiple channels being output at 24a, 24b from the modulators. Using the same carrier frequency for each channel lessens the risk that any audible beat frequencies may occur.

High-pass filters 27a, 27b can also be included after the modulation stage. High-pass filters 27a, 27b can be used to pass the modulated ultrasonic carrier signal and ensure that no audio frequencies enter the amplifier via outputs 24a, 24b. Accordingly, in some embodiments, high-pass filters 27a, 27b can be configured to filter out signals below about 25 kHz. Also, in various embodiments, error correction may be employed to reduce or cancel out distortion that may arise in transmission of the ultrasonic signal through the medium to the listener.

Figure 3A:
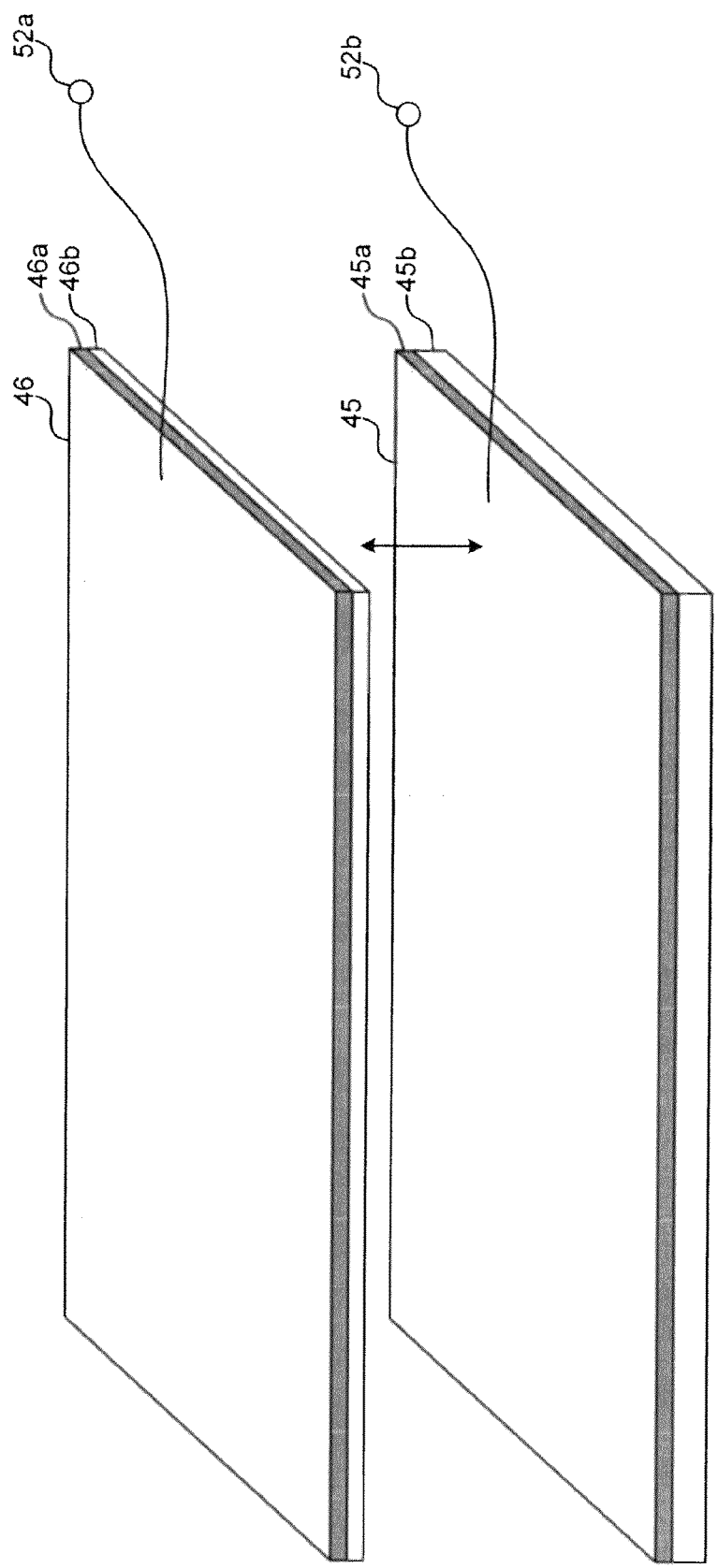
FIG. 3A is an exploded view diagram illustrating an example emitter in accordance with one embodiment of the technology described herein.

FIG. 3A is an exploded view diagram illustrating an example emitter in accordance with one embodiment of the technology described herein. The example emitter shown in FIG. 3 includes sheets 45 and 46, which in various embodiments are transparent sheets. Although sheets 45, 46 can be transparent, non-transparent materials can be used as well. For ease of discussion, the emitter configurations are described herein from time to time as transparent emitters.

However, one of ordinary skill in the art will understand that for various applications, opaque emitters or emitters with varying levels of opacity can be provided as well.

Sheets 45, 46 in the illustrated example, each include two layers 45a, 45b and 46a, 46b, respectively. Sheet 45 in this example, includes a base layer 45b comprising glass or other like material. Sheet 45 also includes a conductive layer 45a provided in the illustrated example on the top surface of base layer 45b. Similarly, in this example, sheet 46 includes a base layer 46b comprising glass or other like material, and a conductive layer 46a provided in the illustrated example on the top surface of base layer 46b. Conductive layers 45a, 46a are illustrated with shading on the visible edges to better contrast the conductive regions and the nonconductive regions. Although some embodiments may use shaded or tinted materials, the shading in the drawings is done for illustrative purposes only.

The conductive layers 45a, 46a can be a thin layer of conductive material deposited on their respective base layers 45b, 46b. For example, conductive layers 45a, 46a can comprise a conductive coating sprayed, evaporated, or otherwise deposited on base layers 45b, 46b. As a further example, the conductive layers 45a, 46a can comprise Indium Tin Oxide (ITO), Fluorine doped Tin Oxide (FTO), transparent gold, so-called hybrid transparent conductive coatings, conductive polymers, metal oxides or other like conductive material coated onto the transparent substrate. Conductive layers 45a, 46a can also comprise a layer of Graphene disposed on the transparent sheet.

Conductive layers 45a, 46a can also comprise a conductive sheet of material laminated or otherwise deposited on base layers 45b, 46b. For example, a conductive mylar or other like film can be laminated or otherwise deposited on base layers 45b, 46b. In still further embodiments, conductive layers 45a, 46a can comprise a doped conduction layer or diffusion layer of conductive material that has been diffused partially or completely into sheets 45, 46 to form conductive layers 45a, 46a. For example, gold or other conductive metals can be diffused into the glass to a desired depth and at a desired concentration to provide conductivity to a desired value (e.g. a desired value of ohms/square). Preferably, the conductive region/layer 45a, 46a has a high degree of transparency (e.g., greater than 80% or 90% in the visible spectrum, although other transparencies can be used) so as not to unduly adversely affect the overall transparency of the emitter.

Accordingly, sheets 45 and 46 comprise base layers 45b, 46b each with a conductive layer 45a, 46a having a low electrical resistance. For example, in one embodiment, the resistance of each conductive layer 45a, 46a can be 100 ohms/square or less. In other embodiments, the resistance of each conductive layer 45a, 46a can be 50 ohms/square or less. In further embodiments, the resistance of each conductive layer 45a, 46a can be 10 ohms/square or less. In still other embodiments, the resistance of each conductive layer 45a, 46a can be 150 ohms/square or less. In yet other embodiments, the resistances of conductive layers 45a, 46a can have other values, and the resistance of conductive layers 45a, 46a need not be equal to one another.

In some embodiments, sheets 45, 46 are implemented using a high-ion-exchange (HIE) alkali-aluminosilicate thin-sheet glass. More particularly, in some embodiments, sheets 45, 46 comprise a sheet of Corning® Gorilla® Glass (available from Corning Incorporated, One Riverfront Plaza, Corning, N.Y. 14831 USA), or other like material. In other embodiments, sheets 45, 46 are implemented using Corning® Willow™ Glass, also available from Corning Incorporated, One Riverfront Plaza, Corning, N.Y. 14831 USA). For example, in one embodiment, sheet 46 is made of Willow Glass and sheet 45 is made of a thicker, more rigid Gorilla Glass. As described elsewhere herein, and as would be apparent to one of ordinary skill in the art after reading this description, other transparent materials can be used for sheets 45 and 46.

Although sheets 45, 46 or their respective base layers 45b, 46b are described above as comprising glass sheets, other transparent materials can be used. For example, polycarbonates, acrylics, Plexiglas, plastics or other like materials can be used. In some embodiments, metallized films with a sufficiently light-transmitting metallic coating so as to provide transparency without adversely affecting viewing of content through the emitter can be used to provide the conductive sheets 45 and/or 46. For example, in one embodiment, a glass or other rigid material can be used for sheet 45 (e.g., to form a rigid backplate for the emitter) and a metallized film can be used for sheet 46. Accordingly, metallized films such as, for example, Mylar and Kapton® can be used as either or both sheets 45 and 46.

In some embodiments, sheet 45 can be of a thickness in the range of about 2 mm-10 mm and sheet 46 can be of a thickness in the range of about 0.05 mm-0.5 mm, although other thicknesses are permitted. For example, in some embodiments, layer 46 is 0.25 mils in thickness and sheet 45 is 20 mils in thickness. A thinner, lower resistance layer between conductive layers 45a, 46a allows operation of the emitter with a lower amount of bias voltage.

In operation, one layer vibrates in response to the electrical signal provided across the layers, launching the modulated ultrasonic signal into the transmission medium (e.g., into the air). Assume, for example, in some embodiments that the emitter is configured such that layer 46 is positioned toward the face of the emitter and vibrates in response to the electrical signal, and sheet 45 is toward the back of the emitter. In some embodiments, sheet 45 may be provided with sufficient thickness to impart a desired amount of rigidity and strength to the emitter. Accordingly, in some embodiments, sheet 45 may be of greater thickness than layer 46. In fact, in various embodiments, layer 46 is provided thin enough to allow it to oscillate and launch the modulated ultrasonic carrier into the air.

In various embodiments, conductive layers 45a, 46a may be much thinner than base layers 45b, 46b. However, for ease of illustration, the dimensions (including the relative thicknesses) of the various layers 45a, 45b, 46a, 46b are not drawn to scale.

Where sheets 45, 46 include a conductive layer 45a, 46a and a base layer 45b, 46b, the intermediate base layer between the two conductive layers (base layer 46b in the illustrated example) can serve as a resistive layer, electrically isolating conductive layer 46a from conductive layer 45a. In various embodiments, this intermediate base layer (46b in the illustrated example) is of sufficient thickness to prevent arcing or shorting between conductive layers 45a, 46a. In further embodiments, this intermediate base layer (46b in the illustrated example) in series with an air gap provided between layers 45 and 46, is of sufficient resistance to prevent arcing or shorting between conductive layers 45a, 46a.

In various embodiments, a separate insulating layer 47 (shown in FIGS. 3B, 3C) can be included to provide additional electrical isolation between layers 45 and 46. Insulating layer 47 can comprise a glass, plastic, or polymer layer or other high-optical-transmittance layer having relatively low conductivity to provide an insulating layer between sheets 45 and 46. For example, insulating layer 47 can have a very high or even a virtually infinite resistance. For applications where a thin emitter is desired, insulating layer 47 can be chosen to be as thin as possible or practical, while preventing electrical shorting or arcing between layers 45 and 46. Insulating layer 47 can be made, for example, using glass, polycarbonates, acrylics, plastics, PET, axially or biaxially-oriented polyethylene terephthalate, polypropylene, polyimide, or other insulative film or material. Preferably, insulating layer 47 has sufficiently high resistivity to prevent arcing between layers 45 and 46. Note that where the insulating properties of base layer 46*b* (in FIG. 3B) are sufficient, insulating layer 47 is not needed (i.e., the embodiment shown in FIG. 3A is sufficient).

For applications where transparency is desired, high transmittance materials in the visible spectrum are preferred. For example, Gorilla Glass and Willow Glass have transmittances of approximately 90% or greater in the visible wavelengths. Materials with high transmittances are well suited for applications where the parametric emitter is affixed to, or used in place of, the display of a content device such as a laptop, tablet, smartphone, computer, television, mobile device, camera, portable GPS unit, or other content display device. Where a two-layer system is used with each layer having 90% or better transmittance, the emitter can be made having a total transmittance of approximately 81% or better. Additional applications are also described below.

Sheets 45 and 46 (and insulating layer 47, if included) can be joined together using a number of different techniques. For example, frames, clamps, clips, adhesives or other attachment mechanisms can be used to join the layers together. The layers can be joined together at the edges to avoid interfering with resonance of the emitter films. Preferably, sheets 45 and 46 (and insulating layer 47 when included) are held together in close, fixed relation to one another.

Spacers 49 (FIG. 4) can be included between layers 45, 46 (and 47, if included) to allow a gap between layers. In various embodiments, an air gap is provided between layer 46 and the next adjacent layer (45 or 47) to allow layer 46 to oscillate in response to the modulated carrier signal. Spacers 49 can be provided in various shapes and forms and can be positioned at various locations between the layers to provide support to maintain the air gap. For example, spacers can be dots or beads made from low-conductivity material such as, for example, glass, plastics, and so on. Spacers can also be made using silicone or other gels, fine dust or sand, transparent liquids or other transparent materials. In various embodiments, the contact area of the spacers 49 at layer 46 is maintained as a small contact area so as not to interfere with oscillation of layer 46. In various embodiments, the air gap can range from 0.1 to 20 mils. In some applications, layer 46 oscillates to a displacement of about 1 micron (0.03937 mils) in order to produce a sufficiently audible signal. Accordingly, the air gap in such embodiments is greater than 0.03937 mils to avoid having the base layer 45 (which may be rigid or mounted on a rigid surface) interfere with the oscillation of layer 46.

In some embodiments such as, for example, the embodiments described below that utilize a conductive mesh as conductive layer 45*a*, there may be less motivation to include spacers 49. Indeed, in examples illustrated in FIG. 5, although they can be included, there are no spacers shown as being included in these examples. This is because the conductive mesh itself can provide spacing or an open volume between layers 45 and 46. It should be noted that where spacers (or another insulating layer) are included, the orientation of layers 46*a* and 46*b* can be reversed due to the insulative properties of the air gap caused by spacers 49 (or insulating layer) between the layers. This can be desirable in some embodiments to protect conductive layer 46*a* from the elements or from being handled by a user. This can also avoid having a conductive surface as the front facing surface of the emitter.

Although conductive sheets 45 and 46 can be the same thickness, in some embodiments, one of the conductive sheets (e.g., sheet 45) can be made of a thicker material to provide greater rigidity to the emitter. Because resonance will be affected by the thickness, this thicker sheet will typically be the sheet positioned away from the listener and form a transparent backing plate of the emitter. For example, conductive sheet 45 can be up to 125 mils in thickness, or thicker, thereby increasing the thickness and rigidity of the emitter.

In some embodiments, with a thicker layer serving as a backing plate, the emitter can replace the screen that might otherwise be present on the display of a content device. In such embodiments, for example, the emitter can be assembled and used to replace the glass (or other material) cover of the content device. In other embodiments, the emitter can be added to the screen of the content device as an outer layer thereof.

Additionally, sheet 45 can be a smooth or substantially smooth surface, or it can be rough or pitted. For example, sheet 45 can be sanded, sand blasted, formed with pits or irregularities in the surface, deposited with a desired degree of 'orange peel' or otherwise provided with texture. This texture can provide effective spacing between sheets 45, 46, allowing sheet 46 to vibrate in response to the applied modulated carrier. This spacing can reduce the damping that might be caused by more continuous contact of sheet 45 with sheet 46. Also, as noted above, in some embodiments, spacers 49 (FIG. 4) can be provided to maintain a desired spacing between sheets 45 and 46. Small spacers 49 can be deposited or formed in the surface of sheet 45 that is adjacent to sheet 46 (or vice versa) to allow a gap to be maintained. Again, this spacing can allow sheet 45 to oscillate in response to the applied modulated carrier signal.

In various embodiments, a non-conductive backing plate (not illustrated) can also be provided. Non-conductive backing plate can also be transparent and can serve to insulate conductive sheet 45 on the back side of the emitter and provide a foundation by which the emitter can be positioned or mounted. For example, conductive sheet 45 can be deposited on a non-conductive, or relatively low conductivity, glass substrate. In another embodiment, conductive surface can be positioned on the screen of a content device.

In operation, sheets 45 and 46 provide opposite poles of the parametric emitter. In one embodiment (and in examples described above) sheet 46 is the active pole that oscillates in response to the application of the modulated carrier signal via contact 52*a*. To drive the emitter with enough power to get sufficient ultrasonic pressure level, arcing can occur where the spacing between conductive sheet 46 and conductive sheet 45 is too small. However, where the spacing is too large, the emitter won't achieve resonance.

If an insulating layer 47 is used, in some embodiments it is a layer of about 0.92 mil in thickness. In some embodiments, insulating layer 47 is a layer from about 0.90 to about 1 mil in thickness. In further embodiments, insulating layer 47 is a layer from about 0.75 to about 1.2 mil in thickness. In still further embodiments, insulating layer 47 is as thin as about 0.33 or 0.25 mil in thickness. Other thicknesses can be used, and in some embodiments, a separate insulating layer 47 is not provided. In some embodiments, insulating layer 47 can be provided with cutouts, holes or other apertures to provide the function of spacers 49. For instance, insulating layer 47 can comprise a sheet with a pattern of holes through the material. The remaining material between the holes can function as the spacers 49. The cutouts can be any shape and size, including circular, square, polygonal, and so on.

Figure 3C:
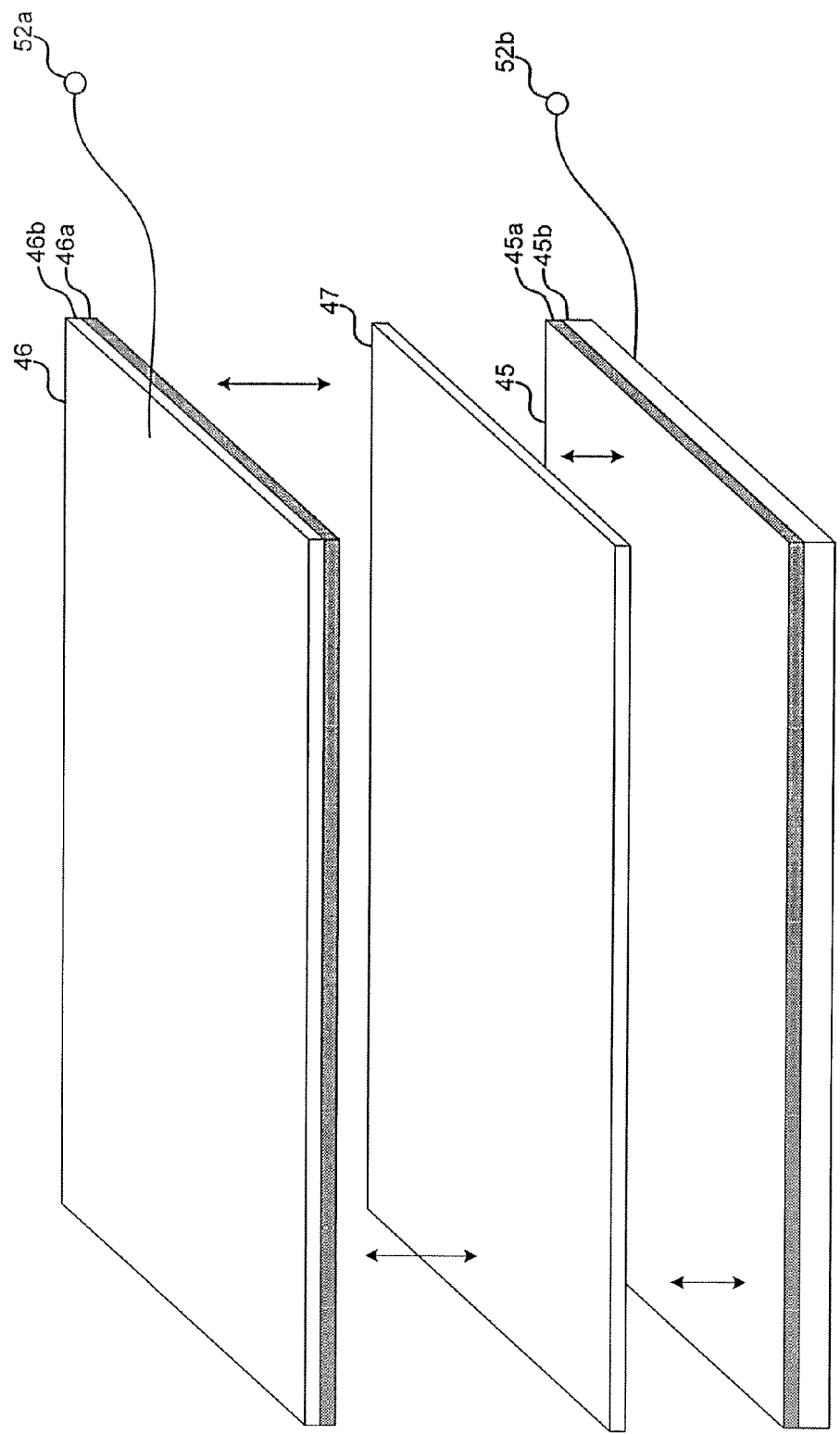
FIG. 3C is an exploded view diagram illustrating an example emitter in accordance with one embodiment of the technology described herein.

One benefit of including an insulating layer 47 is that it can allow a greater level of bias voltage to be applied across the first and second conductive surfaces of sheets 45, 46 without arcing. When considering the insulative properties of the materials between the two conductive surfaces of sheets 45, 46, one should consider the insulative value of insulating layer 47, if included as well as that of the air gap and of base layer 46b, if included.

Where an insulating layer 47 is included, or where the air gap is sufficiently large to prevent arcing, the conductive layers 45a, 46a of sheets 45, 46 can in various embodiments be positioned facing one another as illustrated in FIG. 3C. Also, in other embodiments, the insulating layer 47 can allow avoidance of nonconductive region, or base layer, 46b.

Electrical contacts 52a, 52b are used to couple the modulated carrier signal into the emitter. An example of a driver circuit for the emitter is described below.

Figure 4:
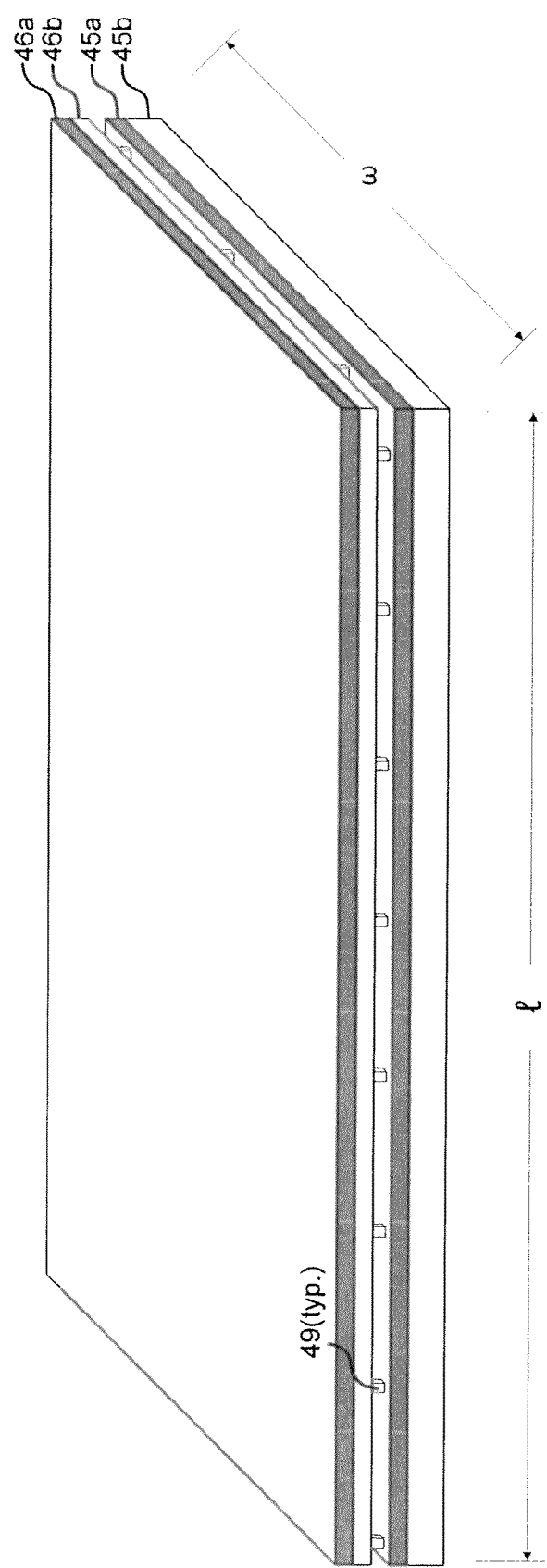
FIG. 4 is a diagram illustrating a cross sectional view of an assembled emitter in accordance with the example illustrated in FIG. 3A.

FIG. 4 is a diagram illustrating a cross sectional view of an assembled emitter in accordance with the example illustrated in FIG. 3A. As illustrated, this embodiment includes conductive sheet 45, conductive sheet 46 and spacers 49 disposed between conductive sheets 45, 46.

The dimensions in these and other figures, and particularly the thicknesses of the layers and the spacing, are not drawn to scale. Conductive layers 45a, 46a are shown in FIG. 4 as shaded. This is done solely to enhance visibility in the drawing. All of the layers can be transparent, or some of the layers can be shaded or tinted as desired. A layer of anti-reflective, anti-scratch (or both) coating (not shown) can be provided on the outer surface of the emitter to enhance visibility and durability of the emitter.

The emitter can be made to just about any dimension. In one application the emitter is of length, l, 3 inches and its width, w, is 2 inches although other dimensions, both larger and smaller are possible. Greater emitter area can lead to a greater sound output, but will typically also require more power. In some embodiments, practical ranges of length and width can be similar lengths and widths of conventional bookshelf speakers. In embodiments where the emitter is used on or as the screen of a content device, the emitter can be sized to be accommodated on or by the casing of the content device or to be commensurate with the device display dimensions.

Sheets 45 and 46 (and insulating layer 47 when included) can be dimensioned to have a length and width desirable for a particular application. For example, where the emitter is used as a facing for a picture frame (e.g., in place of or on top of the picture frame glass), the dimensions of the emitter can be selected to conform to the dimensions of the picture frame. As another example, where a transparent emitter is configured for use as a screen or screen cover on a content device, sheets 45 and 46 (and insulating layer 47 when included) can be dimensioned to conform to the form factor of the content device with which it is used. Large emitters can be made for applications in the television or home theater segment, having a diagonal measurement such as, for example, 36", 50", 55", 60", 65", 70", 80", or 90 inches (or greater), to name a few, with an aspect ratio to match that of the device. For smaller devices such as smart phones, for example, sizes or the order of 3"×2" can be used. In some embodiments, insulating layer 47 can have a larger length and width as compared to sheets 45 and 46 to provide insulation at the edges of the emitter and prevent edge arcing between sheets 45 and 46.

Parametric emitters typically have a natural resonant frequency at which they will resonate. For transparent emitters such as those described herein, their natural resonant frequency can be in the range of approximately 30-100 kHz. For example, 80 kHz. Accordingly, the emitter materials and the carrier frequency of the ultrasonic carrier can be chosen such that the carrier frequency matches the resonant frequency of the emitter. The carrier frequency can be the same as or substantially the same as the resonant frequency of the emitter. In some embodiments, the carrier frequency can be within, for example +/−5%, 10% or 15% of the resonant frequency of the emitter. Selecting a carrier frequency at or near the resonant frequency of the emitter can increase the output of the emitter.

Figure 5A:
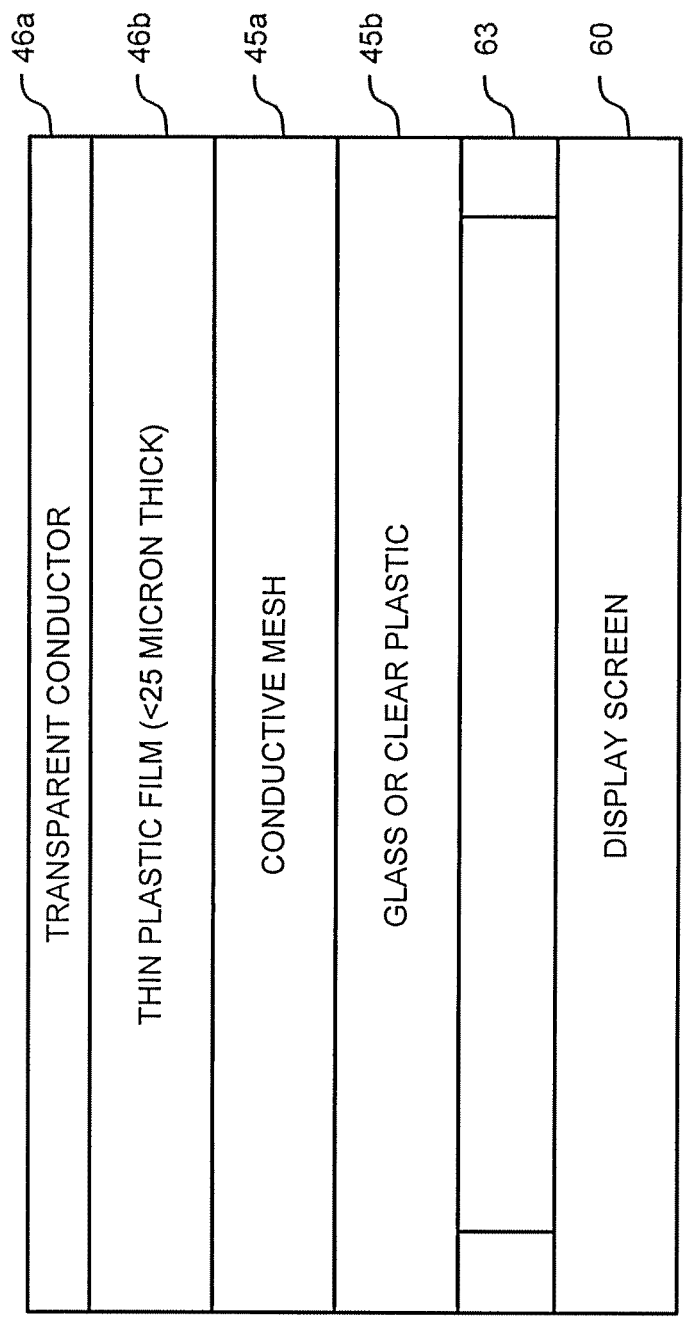
FIGS. 5A-5H, illustrates various further embodiments of a transparent parametric emitter.

FIG. 5, which comprises FIGS. 5A-5H, illustrates various further embodiments of a transparent parametric emitter. Referring first to FIG. 5A, the example emitter includes four layers: a transparent conductive layer 46a, a transparent nonconductive base layer 46b, a transparent conductive layer 45a (implemented in this example as a conductive mesh), and a transparent base layer 45b. In the diagram illustrated in FIG. 5A, the example emitter 6 is illustrated as being mounted to a display screen 60 of a content display device using a mounting assembly 63.

As with the embodiments described above, transparent base layer 45b can comprise any of a number of different transparent materials including, for example, glasses, Plexiglas, plastics, and other like materials. Transparent base layer 45b could also comprise the outermost layer of an LCD (or other display), such as, for example, a polarizer, outer glass, or other outer layer.

In the illustrated example, conductive layer 45a is illustrated as being implemented using a conductive mesh. The conductive mesh suitable for use as conductive layer 45a is preferably a conductive wire mesh sufficient transparency so as to not unduly interfere with the viewing of content from the content device.

Conductive meshes can, for example, be fabricated directly onto the surface of base layer 45b or free-standing conductive meshes can be used and attached to base layer 45b. For example, conductive meshes such as those typically used for touchscreen displays can be used as the conductive mesh for a conductive layer 45a. As another example conductive meshes such as those used for EMI shielding can also be used. The former may be more desirable for a transparent emitter as conductive meshes used for touchscreen displays tend to have a higher degree of transparency than those used for EMI shielding.

The conductive mesh can be a woven mesh of conductive wires in an over/under lattice pattern, or it can be any other configuration of conductive wires can be laid down to form conductive layer 45a. The mesh would ideally comprise small diameter conductive wires so as to not interfere with content viewing. In various embodiments, the conductive wires can be on the order of approximately 20-50µ in diameter, although other wire diameters can be used. For example, in some embodiments metallic wires ranging from 5 to 80µ in diameter can also be used. The wire diameter chosen, can be important for 2 reasons. First, as noted above, thin wires can be better for viewability of the display through the emitter. On the other hand, it is important to have openings (i.e. open volumes) between conductive sheet 46 and conductive sheet 45. The diameter of the fibers or the thickness of the weave can determine the spacing between the transparent base layer 45b and the base layer (46b) of conducting layer 46, which will affect the resonant frequency of the emitter.

An example of this is illustrated in FIG. 5 B. With reference to FIG. 5 B is shown a cross-sectional view of an example of a conductive mesh 70 having a traditional plain weave of warp (longitudinal) and weft (lateral) wires woven in an over/under pattern. For purposes of discussion, the weft wires 71 are illustrated as those wires coming out of the page, while the warp wire 72 is the wire running across the page. In the embodiment illustrated in FIG. 5 B, the weft wires 71 are shown as having a larger diameter than the warp wire 72. However, in other embodiments, the warp and weft wires can have the same diameter or substantially the same diameter, or the warp wire can have a larger diameter than the weft wires. As seen from this example, the overall thickness of the conductive mesh 70 defines the spacing between transparent base layers 45b and 46b.

Figure 5B:
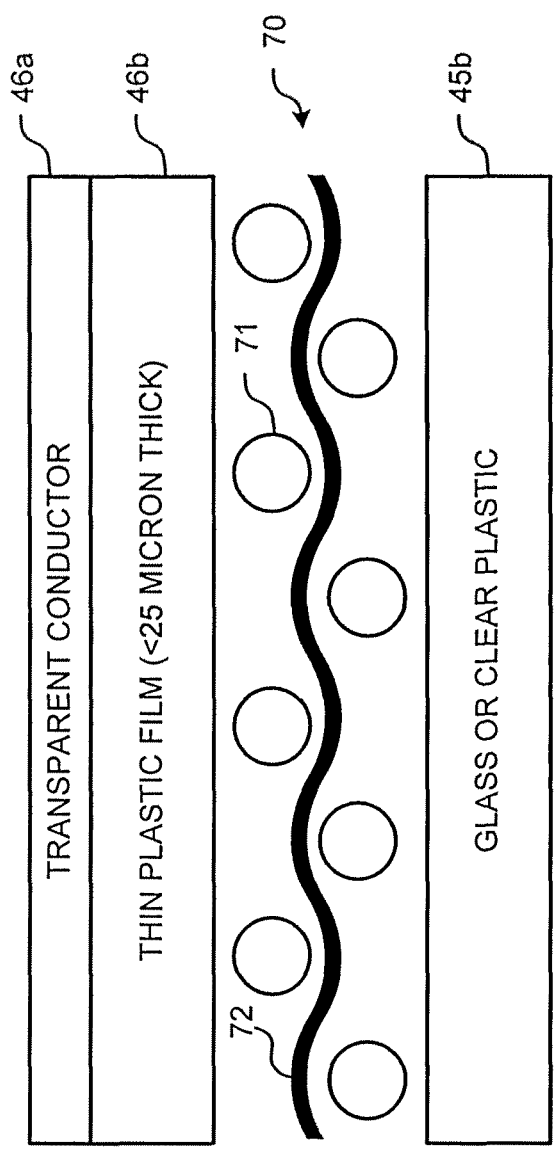

Although the wires in FIG. 5B are illustrated as being round wires, other wire shapes can be used. The cross section of the wires may, but need not, have a 1:1 height-to-width ratio. For example, flattened wires can also be used to provide the appropriate level of conductivity while reducing the amount of spacing between conductive layer 46a and transparent base layer 45b. Wires with rectangular cross section that are tall and narrow may be used to provide sufficient air volumes between the layers while maintaining high transparency.

The conductive mesh 70 may typically be metallic wires, but cloth, nylon, yarns or other wires or filaments coated, woven with, threaded with, alloyed with, layered with, or otherwise incorporating conductive materials could also be used. In some embodiments, metallic wires can comprise silver, copper, gold, or other conductive metals or alloys. As one example, a nickel- or silver-coated stainless steel wire can be used. Because metallic components can tend to be highly reflective, the wire mesh may tend to interfere with the content display. Accordingly, the conductive wires can be coated to reduce reflections when place in front of the display. For example, a black or other dark coating, preferably a flat or nonreflective paint or other coating, can be applied to the wire.

The transparency of a mesh can be defined by its open area. A simple conductive mesh can range from about 70% to about 90% transparent (i.e. about 10 to about 30% wire area, and the remainder open area), although other transparency values can be implemented. Typically, a conductive mesh with a higher level of transparency (i.e. the more open area), with all other factors being equal, will yield a result with less visual interference to the content display. However, because conductivity is also desired for the mesh, the conductivity also becomes a design trade-off with the transparency. Different thread-count meshes can be used, and examples include conductive meshes with a thread count of 30-130 openings per inch (OPI), although other thread count can be used. In addition to maintaining high transparency, it may be desirable to maintain low haze and a neutral color. Haze values below 5% and color coordinates of a*b* close to 0 may be important display considerations in addition to high transparency.

Figure 6:
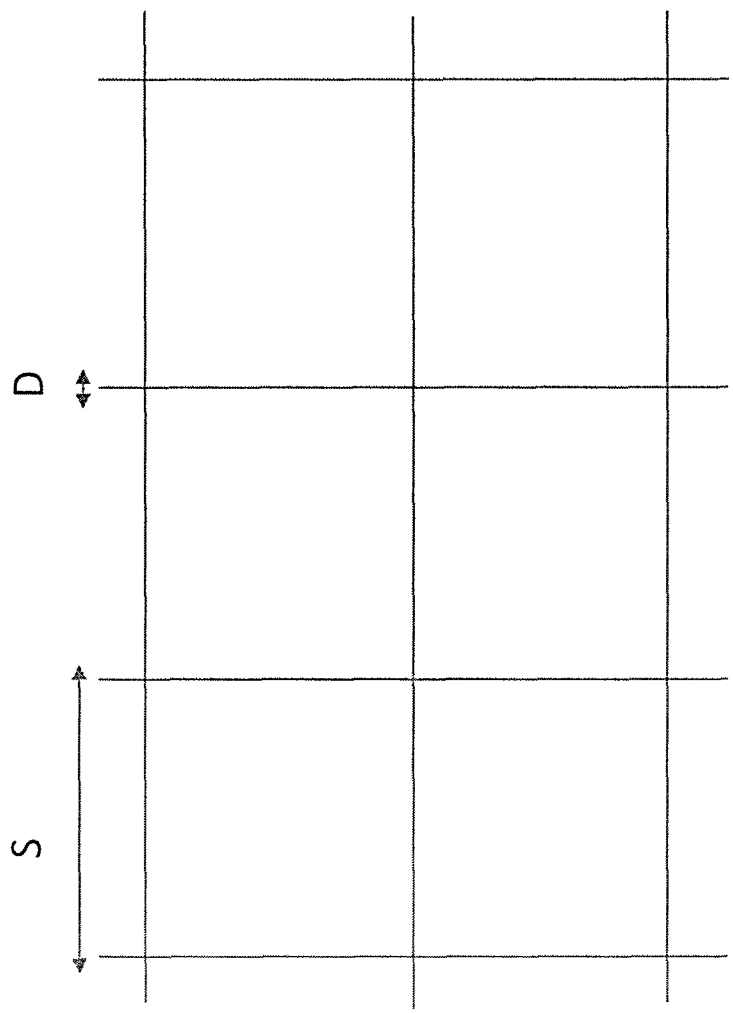
FIG. 6 is a diagram illustrating by way of simple example how to approximate the open area of a plurality of openings of a wire mesh in accordance with one embodiment of the technology disclosed herein.

FIG. 6 is a diagram illustrating by way of simple example how to approximate the open area of a plurality of openings of a wire mesh in accordance with one embodiment of the technology disclosed herein. Referring now to FIG. 6, this example shows a section of a mesh having a wire pitch defined by S, and a wire diameter D. In such an example then, the open area provided by the openings on a percentage basis can be calculated as:

$$\frac{(S-D)^2}{S^2}$$

Referring again to FIG. 5, as noted above, the conductive mesh 70 can be a woven mesh such as, for example, a mesh that is woven in a "plain" weave, where each wire subsequently goes up and over the next wire. Other weaves such as, for example, intermediate crimp, lock crimp, and twilled could work as well.

The mesh count and wire diameter together determine the resonant frequency of the emitter. The resonant frequency is determined by both the volume of air trapped between the front film and the back plate, as well as the resonant frequency of the "drum mode" of the front film. For example, a 50 mesh/1.2 mil wire diameter mesh emitter with a ¼ mil Mylar front film has a resonant frequency of ~90 kHz.

In some embodiments, the mesh wires can be coated with an insulating material such as, for example, an enamel. In such embodiments, nonconductive base layer 46b of conductive layer 46 may not be necessary in applications in which insulation provided by the insulated wire mesh provides sufficient insulating isolation between conductive layer 46a and conductive layer 45a (i.e. sufficient to prevent shorting between the layers under operating conditions. Also, in embodiments in which nonconductive base layer 46b is provided, the insulating coating on the mesh allows the transparent conductive layer to be faced inwards towards the mesh, and yet not electrically short to the mesh.

Figure 5C:
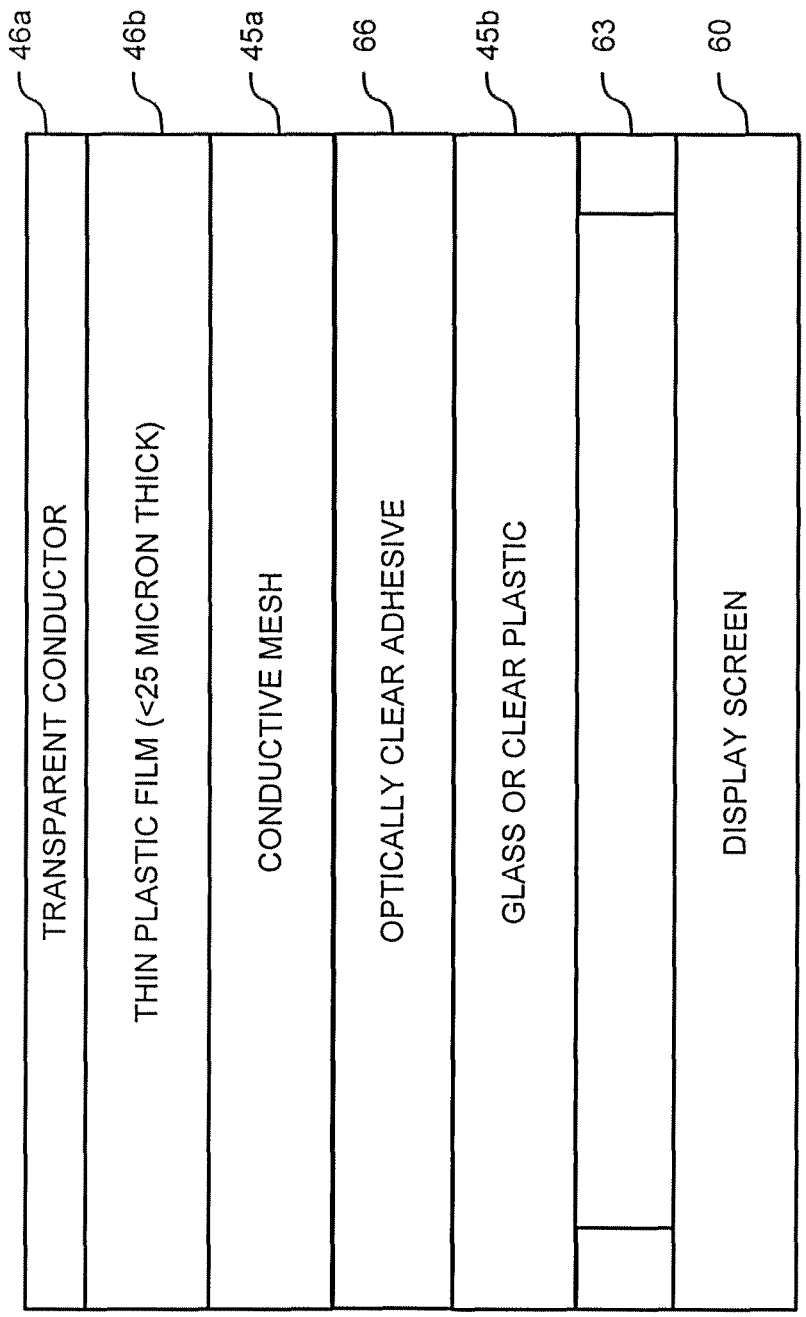

In various embodiments, the conductive mesh 70 is fixedly mounted to the surface of transparent base layer 45b. An optically transparent adhesive can be used to secure the mesh to transparent base layer 45b to prevent vibrations. FIG. 5C is a diagram illustrating an example using an optically transparent adhesive 66 to bond the conductive mesh to the transparent base layer 45b.

Ideally, the adhesive is applied in such a manner that it does not fill in the holes (open volumes) between the wires in the mesh. As noted above, these open volumes can be important to the operation of the transparent emitter, allowing conductive layer 46 the ability to vibrate in response to the applied signal, and also defining the resonant frequency of the emitter.

Figure 5D:
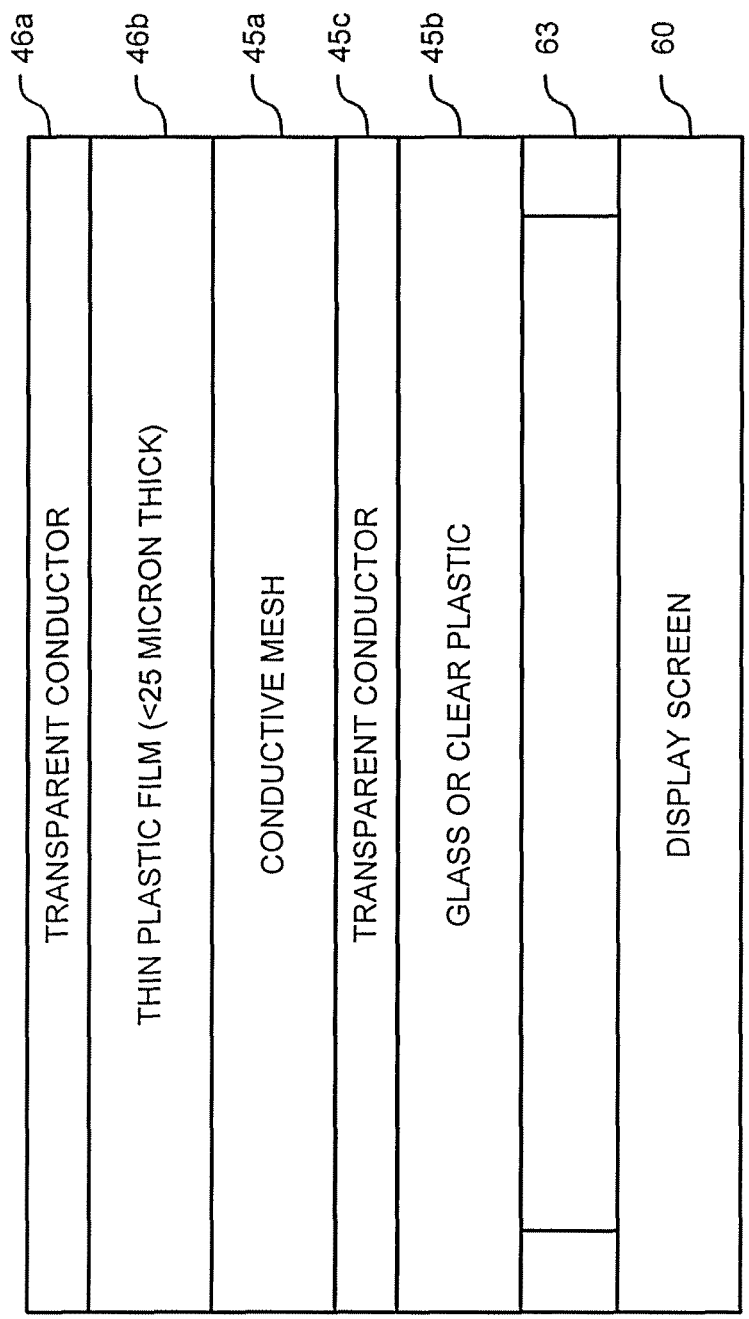

In addition to including the conductive mesh, as discussed above in various embodiments, transparent base layer 45b can also be coated with a transparent conductive material such as ITO, FTO, graphene, or others to enhance the electric field between the mesh and transparent conductive layer 46a. This transparent conductive layer applied on the surface of transparent base layer 45b can also permit the application of a static voltage, and therefore an electric field, between the openings of the mesh and conductive layer 46a. This will work as a static force which attracts layers 46a and 46b to layer 45, effectively pinning the mesh down. This may be an alternative to using a transparent adhesive to glue down the mesh. An example of this is shown at FIG. 5D, in which transparent conductive layer 45c is shown as being disposed between layers 45a and 45b.

The mesh can be applied by tensioning the mesh in either or both major dimensions as it is being adhered to the surface of the transparent base layer 45b. This helps to provide a flat weave and can also facilitate creating a regular pattern in the mesh. It may be useful to avoid overstretching or skewing the mesh as it is being applied to transparent base layer 45b in other words, in some embodiments, each square defined by the wires in the mesh are of identical length and width to increase the sharpness of the resonance peak.

In addition to the materials, coating and spacing, the orientation of the mesh can also be important to the transparent emitter. For example, in some embodiments, the conductive mesh 70 is oriented with respect to the pixel pattern in the underlying display (e.g., the display of the content display device) to minimize or avoid the appearance of an interference pattern such as a moiré pattern. Wire spacing as well as mesh orientation can both be important to avoiding this type of interference pattern.

Although conductive layer 46 can be implemented as described above, in some embodiments, a silver nanowire coating or other like conductive, transparent coating can be applied to form conductive layer 46a of conductive layer 46. An ink coating can be applied by hand or by machine onto a metallized or non-metallized nonconductive base layer 46b (whether Mylar, Kapton, glass, plastic, etc.) and dried. As one example, the silver nanowire or other transparent conductive coating can be applied using a roll-to-roll processing or other known coating methods such as, for example, slot-die coating, gravure and so on. The film can be dried naturally, or it can be dried using drying equipment such as, for example, an oven. In some embodiments, an etchant can be applied to the surface of nonconductive base layer 46b to improve adherence of the ink coating thereto. Additionally, or alternatively, a transparent overcoat layer can be coated over the nanowire layer, to improve adhesion of the nanowire layer to the transparent base layer 46b.

In various embodiments, the film can be applied to a wet coating thickness of about 10-30μ, although other thicknesses can be applied. Controlled drying zones and other techniques can be used to create a uniform or substantially uniform thickness.

The metallization or conductive layer 46a is preferably added at a thickness intended to generate a desired conductivity for the system. As noted above, the amount of resistance presented by conductive layer 46a can vary, and suitable resistance values can be, for example, approximately 10 ohms per square or less. In one embodiment, conductive layer 46a is provided at a thickness that yields approximately 50 ohms per square of resistance. In various embodiments, resistances of 1 ohm per square and up to several hundred ohms per square may be acceptable. In further embodiments, layers with yet other resistances are implemented.

An important factor in the allowable sheet resistance for suitable functioning of the emitter is the overall RC time constant of the emitter. The emitter is essentially a capacitor, typically measuring in the range of 10-30 nanofarads (nF), depending on the size and exact geometry of the layers (for an emitter approximately 7"×13" in area). Assume for purposes of discussion, an example value of 30 nF. Further assume an operating frequency of 100 kHz. The RC circuit of the emitter forms in essence a low pass filter, where it is desired that the input voltage across the entire emitter be equal to the output voltage across the capacitor. The condition for this to be true is when:

$$f < \frac{1}{2\pi} \cdot \frac{1}{RC}$$

For f=100,000 Hz and C=30 nF, this leads to R<50 ohms. This condition indicates that the sheet resistance desired for optimal operation in this scenario is a range from approximately Rs<50 ohms/square to Rs ~500 ohms/square.

The embodiments described above described contacts on conductive layers 45, 46. In some embodiments, a long, thin contact along one or more edges of the conductive layers 45a, 46a of conductive layers 45, 46 can be used to couple the signals on to the emitter. The use of a highly conductive (e.g., silver, copper, gold, etc.) bus bar across one or more than one side of the emitter would improve the emitter from an RC time constant perspective, as that would allow the applied voltage to be essentially applied uniformly or substantially uniformly from all sides of the emitter, reducing the longest path that current must travel within the transparent conductive layer. The use of highly conductive silver bus bars is not uncommon in applications for touchscreen displays, and these bus bars may be hidden from the user by the display bezel, which can be an opaque plastic, or an opaque paint. Bus bars can be applied by several different methods including screen printing, stencil printing, and photolithography. It should be noted that, as the emitters get larger, the capacitance of the emitter will increase, thus requiring a lower resistance.

Also shown in FIG. 5A is a mounting assembly 63. Mounting assembly 63 can include, for example, ultrahigh bond (UHB) or very high bond (VHB) tape or glue, although other adhesives or mounting mechanisms can be provided. Preferably, the mounting assembly is disposed about the periphery of display screen 60 such that it does not interfere with the transparency of the emitter. In some embodiments, transparent adhesives can be used and can be applied to bond the transparent base layer 45b to display screen 60 about the periphery and in other areas as well.

Figure 5E:
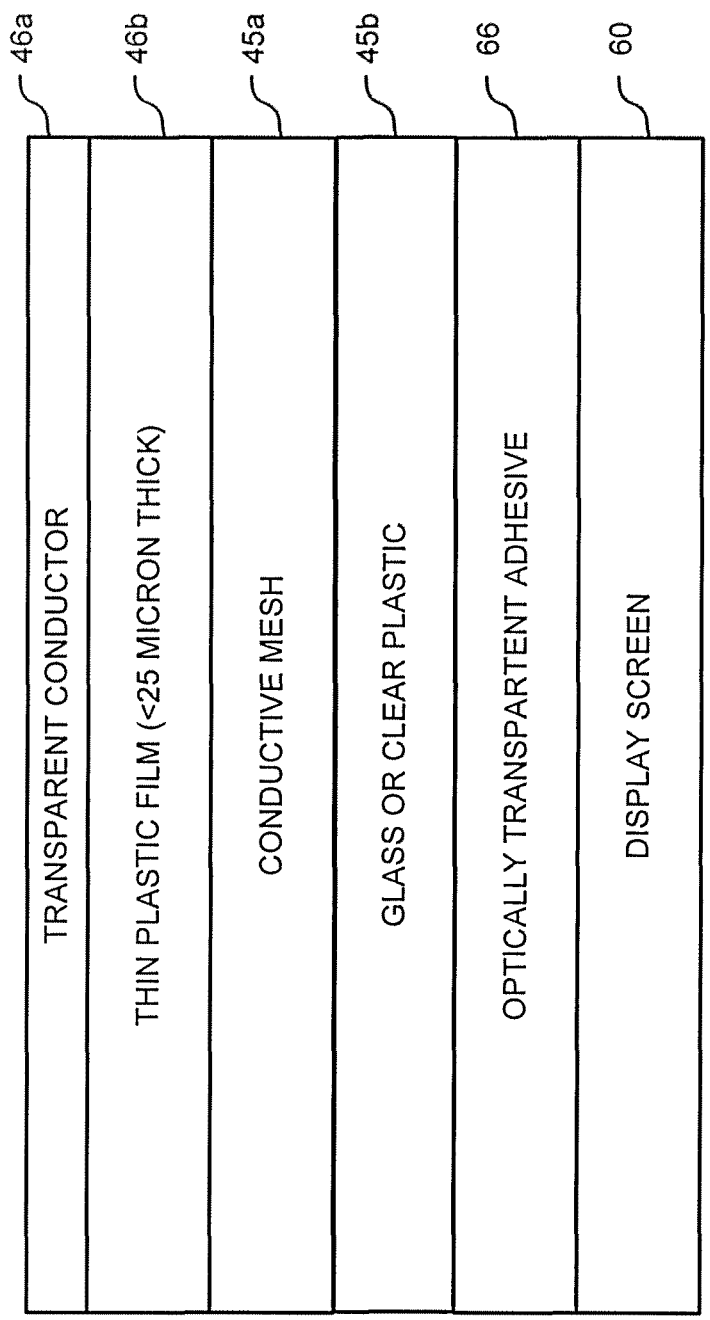

In further embodiments, the transparent emitter can be adhered to the display screen 60 of the content device using an optically transparent adhesive such as, for example, optically transparent adhesive 66 as described above. Ideally, optically transparent adhesive 66 has a high degree of transparency such as, for example, greater than 70%. Optically clear or transparent adhesive can be applied in a thin film across the entire area of the joined surfaces, or it can be laid down in a pattern on either or both surfaces before they are joined. An example of an emitter affixed to a display screen using an optically transparent adhesive is shown in FIG. 5E.

Figure 5F:
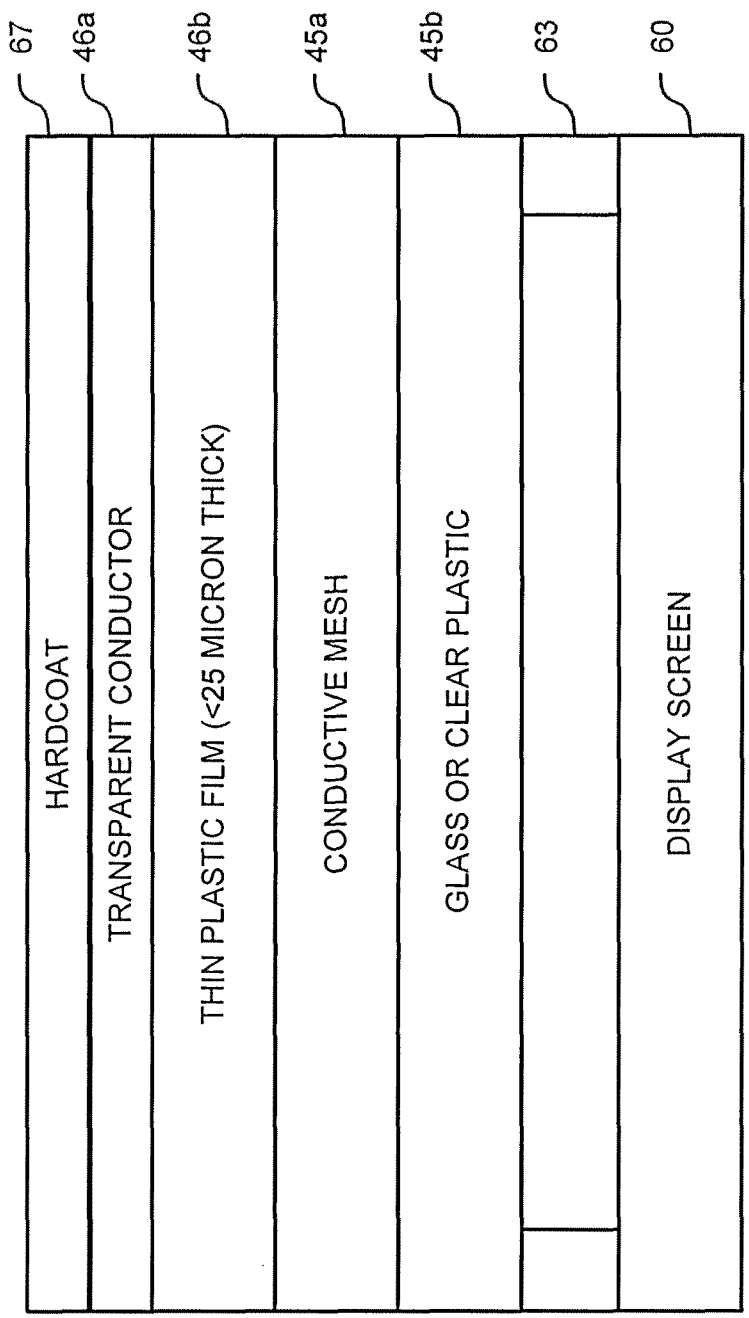

The transparent conductive coating forming conductive layer 46a may, in some embodiments, be coated with a protective, insulating, clear layer. FIG. 5F is a diagram illustrating an example emitter including a hard coat 67 applied at the outer surface of conductive layer 46a of the emitter. Such a layer can be applied to protect the transparent conductive coating from degradation due to exposure to the environment. The hard coating is preferably capable of withstanding large electric fields. In the example illustrated in FIG. 5F, the outer surface of the emitter (i.e., the surface facing the user) is coated with the hard coat 67. Preferably, the hard coat 67 is placed on the outer surface of the emitter to improve its durability and improve its resistance to scratches that could otherwise damage the conductive layer 46a or impair the transparency or appearance of the emitter. In some embodiments, the hard coat 67 can be a coating that is 3H or harder. In other embodiments, coatings of 1H or harder can be applied. In various embodiments, the hardcoat is applied thick enough to impart additional hardness or durability to the layer, but not so thick that it adversely affects the resonant frequency of the device or the ability of the device to produce a signal at acceptable power levels. In some embodiments where the layer is a film such as, for example, Mylar, it may be desirable to coat both sides of the film with hardcoat to avoid curling of the film.

In various embodiments, the front film can itself comprise a thin layer of transparent conductive material such as graphene, without requiring support from a base layer. In other words, in some embodiments, conductive layer 46a can be implemented without base layer 46b. Therefore, in some embodiments, conductive layer 46 may be implemented as a thin layer of graphene, or a thin composite of plastic and graphene.

Figure 5G:
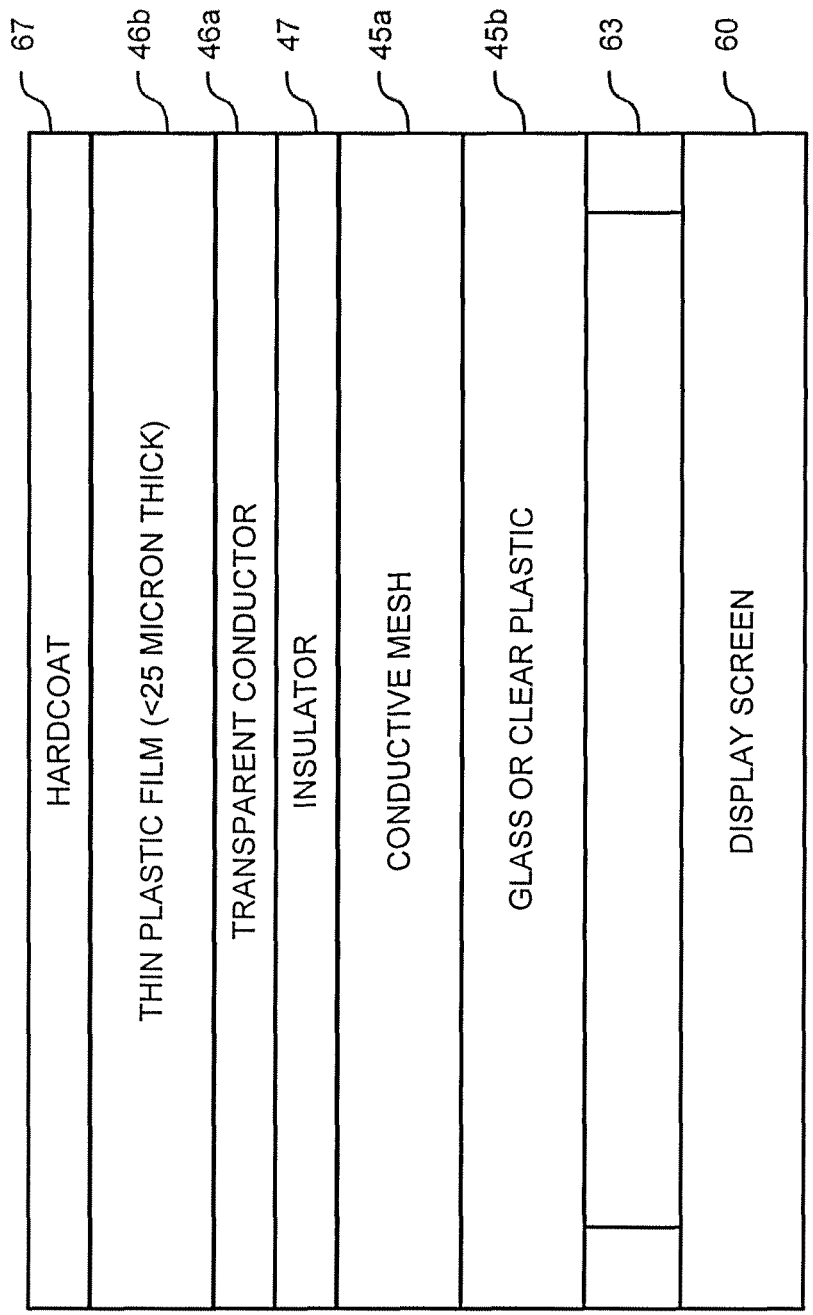

In further embodiments, the emitter can also be configured such that transparent conductive layer 46a of the front film is facing inward toward the conductive layer 45, instead of outward toward the listener. An example of this is shown in FIG. 5G. In this example, an insulating layer 47 is provided to shield or insulate conductive layer 46a from conductive layer 45a. In addition to or in lieu of insulating layer 47, spacers or other like mechanisms can be used to provide an air gap between transparent layers 46a and 45a. As illustrated, the hard coat 67 is still provided on the outer facing surface of the emitter to protect it from damage. Orienting conductive layer 46 such that the transparent conductive layer 46a is facing inward toward the backing plate can increase the durability of the emitter.

Figure 5H:
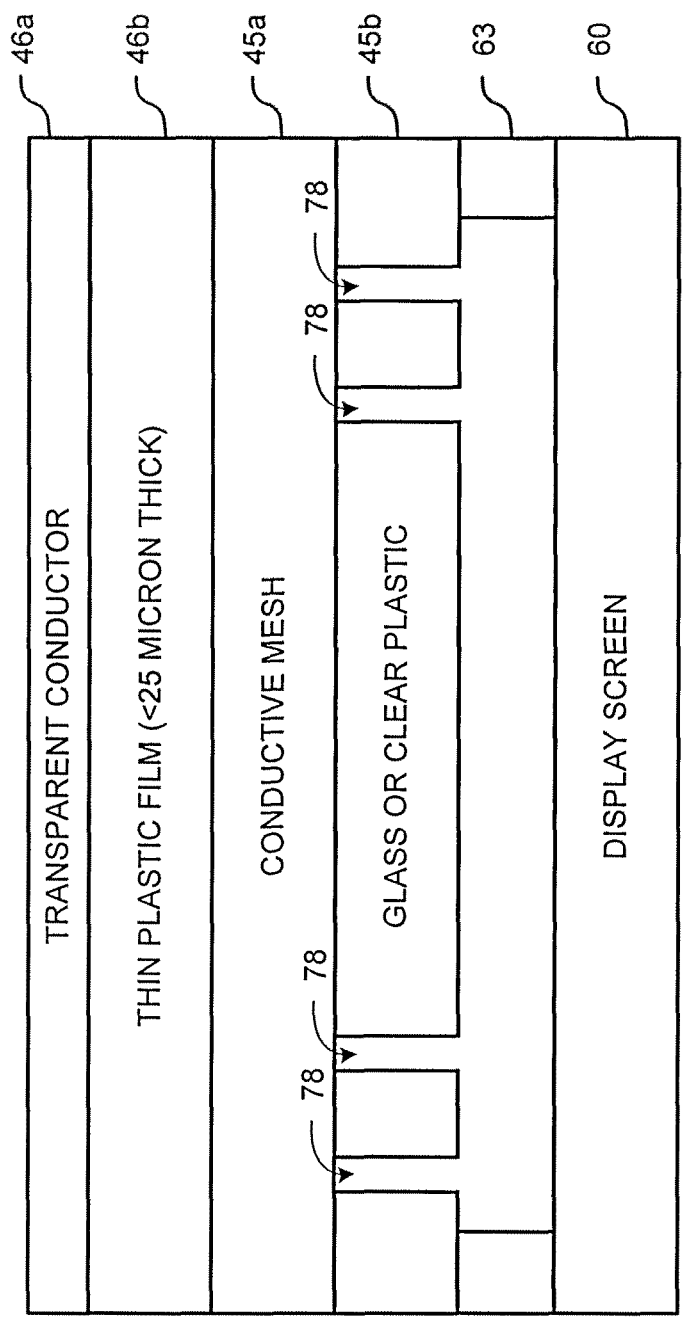

As noted above, the open volume between conductive layer 46 and transparent base layer 45b is a factor defining the resonant frequency of the emitter. In some embodiments, the openings can be provided in transparent base layer 45b to yield an additional volume between the layers. An example of this is illustrated in FIG. 5H in which cavities or holes 78 are provided in base layer 45b providing additional air volume. In the embodiment illustrated in FIG. 5H, holes 78 extend all the way through base layer 45b. Although not illustrated, in other embodiments, holes 78 can be configured to expand partly through base layer 45b. The desired number and volume of the holes or cavities can be chosen to provide the additional desired volume to achieve a determined resonant frequency. Cross members can be included (not shown) to provide support for sections of base layer 45b that are between holes 78. Preferably, such cross members do not block holes 78 completely. In further embodiments, glass spacers (not shown) can be provided between base layer 45b and display screen 60 to provide support to sections of base layer 45b that are between holes 78. In still further embodiments, a base layer 45b with one or more holes 78 can be mounted directly to the underlying display screen 60 with or without transparent spacers therebetween. In embodiments using holes to increase the volume, it may be possible to use a smaller diameter wire for the conductive mesh. In some embodiments for example, a mesh having wire diameters such that the wire width is approximately 5μ and the mesh height is approximately 5μ.

Also not shown, spacers, for example transparent spacers, can be disposed between the conductive mesh and conductive layer 45a and base layer 45b to provide an additional air volume to define the resonant frequency. This can help to set a desired gap between conductive layer 45a and base layer 45b.

Alternative backplate configurations may be utilized in various embodiments to provide the volume used to achieve a desired resonant frequency, and other methodologies may be used to texture the backplate. For example, a conductive grid can be printed and/or etched directly onto a glass/plastic surface, and then conductive dots can be stencil printed or otherwise disposed at the intersection points on the grid. The conductive grid can comprise conductive materials of sufficient conductivity to provide a conductive surface for the emitter, and it may be sufficiently thick to create adequate air volume for resonance.

Figure 7:
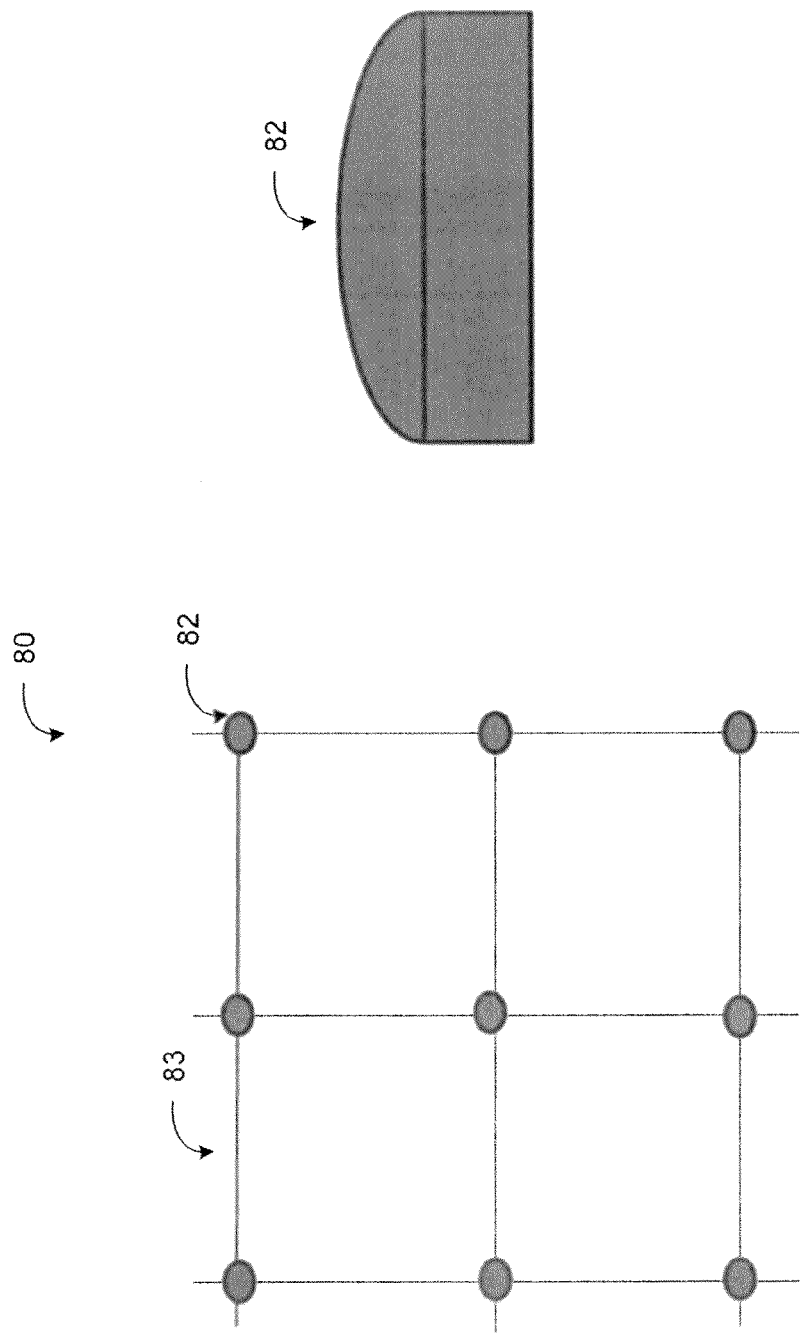
FIG. 7 is a diagram illustrating an example of a conductive grid in accordance with one embodiment of the technology disclosed herein.

FIG. 7 is a diagram illustrating an example of a conductive grid in accordance with one embodiment of the technology disclosed herein. Referring now to FIG. 7, in this example, a conductive grid 80 includes a series of conductive dots 82 disposed at intersection points of the grid. Some or all of conductive dots 82 are conductive to provide a sufficiently low resistance for the conductive layer. Some or all of the interconnects 83 are also conductive to allow electrical coupling between the conductive dots 82. A side view of an example conductive dot 82 is provided on the right-hand side of FIG. 7. In this example, conductive dot 82 includes a rounded surface on one side. However, other shapes for conductive dots can be used.

Figure 8:
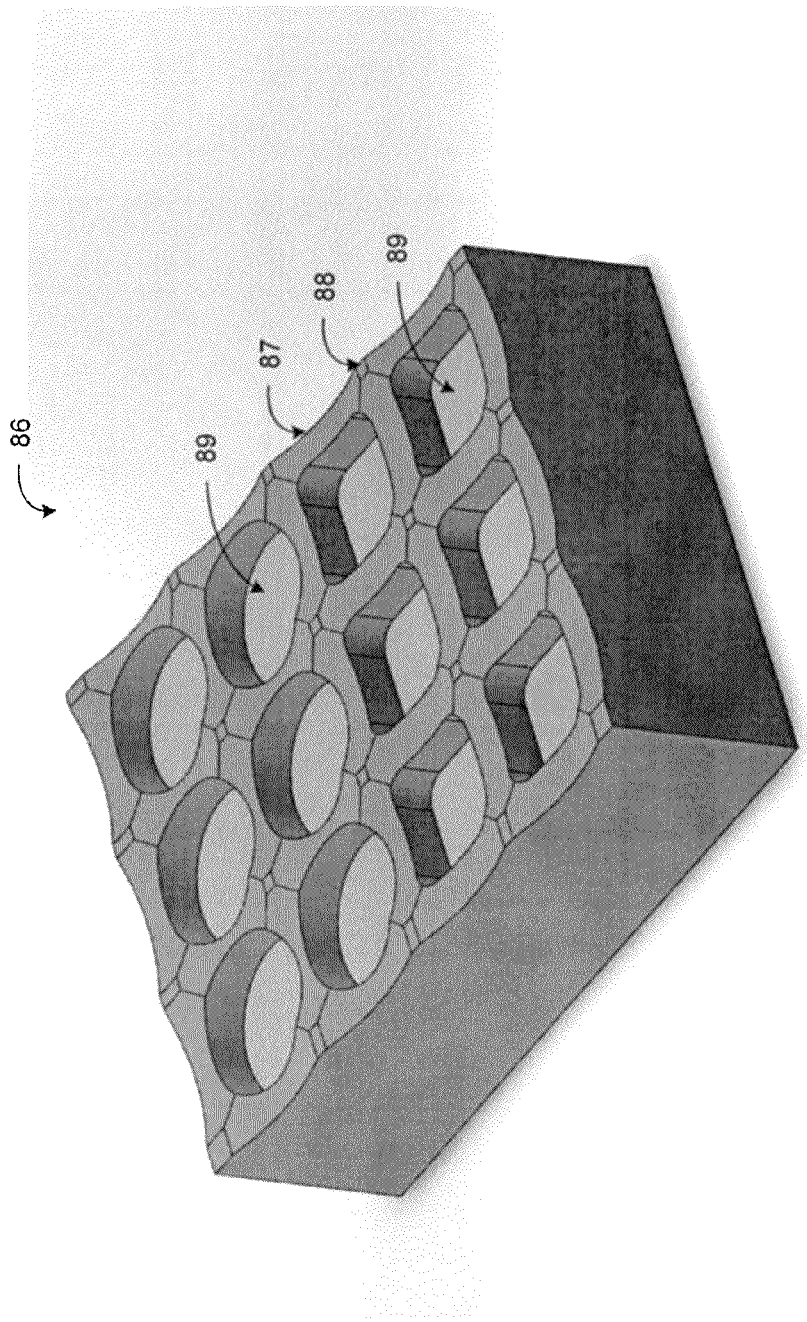
FIG. 8 is a diagram illustrating yet another example embodiment for a conductive backplate of the emitter.

FIG. 8 is a diagram illustrating yet another example embodiment for a backplate of the emitter. In this example, backplate 86 is a textured backplate having a plurality of undulating ridges comprising a plurality of valleys 87 defined between pairs of peaks 88. In this example, the peaks 88 have flattened tops or mesas to support the film disposed above the backing plate. The peaks 88 defining valleys 87 support the front film (e.g., conductive layer 46) to provide open volume for resonance. Likewise, openings 89 within the structure also provide open volume for resonance. Keeping peaks 88 small can help to avoid interfering with vibration of the film.

In the example of FIG. 8, the area ratio of structure to holes is large for purposes of illustration. In various embodiments, it is anticipated that the area for the holes will be much greater than that consumed by the backplate structure to provide a higher degree of transparency. In other words, the material for the backplate structure can be made very thin in order to increase the transparency. Alternatively, the backplate structure can be made using a transparent material with a conductive coating, or made using a transparent conductive material. The backplate structure can be made, for example, by etching, lithography, inkjet printing, machining, casting, and other manufacturing techniques. In some embodiments, the textured backplate structure can be optically bonded to the display.

This example also shows two alternative exemplary configurations: one with somewhat square openings 89, and another with round openings 89. As will be apparent to one of ordinary skill in the art after reading this description, other hole or opening configurations can be provided as can other textures for the peaks and valleys.

A few prototypes of the transparent emitter were constructed and tested. In a first example, a 7"×10" transparent emitter was constructed with 50 mesh, 1.2 mil wire, and silver nanowire disposed on a mil Mylar sheet yielding a resistance of 100 ohm/square. During testing, the results measured were 74 dB of 1 kHz audio with an applied bias voltage of 350 Vdc and a 300 V peak-to-peak AC voltage used to drive the emitter. The carrier was at 93 kHz with a 1 kHz modulated tone.

In another example, a 6"×12" sheet of glass was coated with a transparent conductor. In this example, the transparent conductor was silver nanowire having a resistance of 100 ohms per square, however, other materials such as ITO, FTO, graphene, and others could have been used. A blackened woven metal mesh with 50 openings per inch, and 40 micron diameter wire was stretched and adhered to the surface of the glass on its edges. Then, a 3.5-micron Mylar sheet coated with silver nanowires to 50 ohms per square was stretched over the mesh and glued on the perimeter, with the silver nanowire side facing away from the mesh. The emitter was biased with 275 Volts DC, and driven with 220 V peak-to-peak AC. The emitter had a resonant frequency of 91 kHz, and produced 79-decibel tone of 1 kHz tone at 1 meter.

Figure 9A:
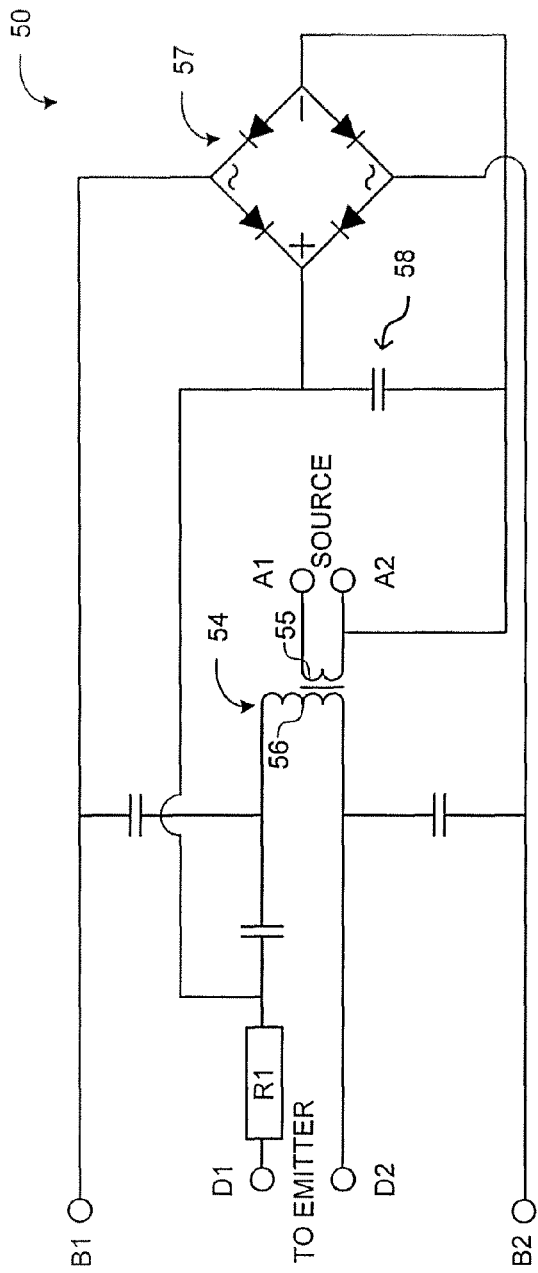
FIG. 9A is a diagram illustrating an example of a simple driver circuit that can be used to drive the emitters disclosed herein.

FIG. 9A is a diagram illustrating an example of a simple driver circuit that can be used to drive the emitters disclosed herein. As would be appreciated by one of ordinary skill in the art, where multiple emitters are used (e.g., for stereo applications), a driver circuit 50 can be provided for each emitter. In some embodiments, the driver circuit 50 is provided in the same housing or assembly as the emitter. In other embodiments, the driver circuit 50 is provided in a separate housing.

This driver circuit is only an example, and one of ordinary skill in the art will appreciate that other driver circuits can be used with the emitter technology described herein.

Figure 10:
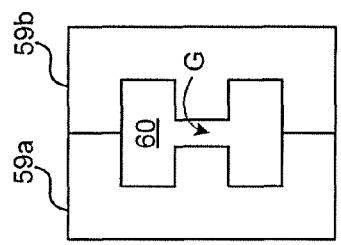
FIG. 10 is a diagram illustrating a cutaway view of an example of a pot core that can be used to form a pot-core inductor.

Typically, the modulated signal from the signal processing system 10 is electronically coupled to an amplifier (not shown). The amplifier can be part of, and in the same housing or enclosure as driver circuit 50. Alternatively, the amplifier can be separately housed. After amplification, the signal is delivered to inputs A1, A2 of driver circuit 50. In the embodiments described herein, the emitter assembly includes an emitter that can be operable at ultrasonic frequencies. The emitter (not shown in FIG. 10) is connected to driver circuit 50 at contacts D1, D2. An inductor 54 forms a parallel resonant circuit with the emitter. By configuring the inductor 54 in parallel with the emitter, the current circulates through the inductor and emitter and a parallel resonant circuit can be achieved. Accordingly, the capacitance of the emitter becomes important, because lower capacitance values of the emitter require a larger inductance to achieve resonance at a desired frequency. Accordingly, capacitance values of the layers, and of the emitter as a whole can be an important consideration in emitter design.

A bias voltage is applied across terminals B1, B2 to provide bias to the emitter. Full wave rectifier 57 and filter capacitor 58 provide a DC bias to the circuit across the emitter inputs D1, D2. Ideally, the bias voltage used is approximately twice (or greater) the reverse bias that the emitter is expected to take on. This is to ensure that bias voltage is sufficient to pull the emitter out of a reverse bias state. In one embodiment, the bias voltage is on the order of 420 Volts. In other embodiments, other bias voltages can be used. For ultrasonic emitters, bias voltages are typically in the range of a few hundred to several hundred volts.

Although series arrangements can be used, arranging inductor 54 in parallel with the emitter can provide advantages over series arrangement. For example, in this configuration, resonance can be achieved in the inductor-emitter circuit without the direct presence of the amplifier in the current path. This can result in more stable and predictable performance of the emitter, and less power being wasted as compared to series configuration.

Obtaining resonance at optimal system performance can improve the efficiency of the system (that is, reduce the power consumed by the system) and reduce the heat produced by the system.

In other embodiments, the inductor can be configured to form a series resonant circuit with the emitter. With a series arrangement, the circuit causes wasted current to flow through the inductor. As is known in the art, the emitter will perform best at (or near) the point where electrical resonance is achieved in the circuit. However, the amplifier introduces changes in the circuit, which can vary by temperature, signal variance, system performance, etc. Thus, it can be more difficult to obtain (and maintain) stable resonance in the circuit when the inductor 54 is oriented in series with the emitter (and the amplifier).

Figure 9B:
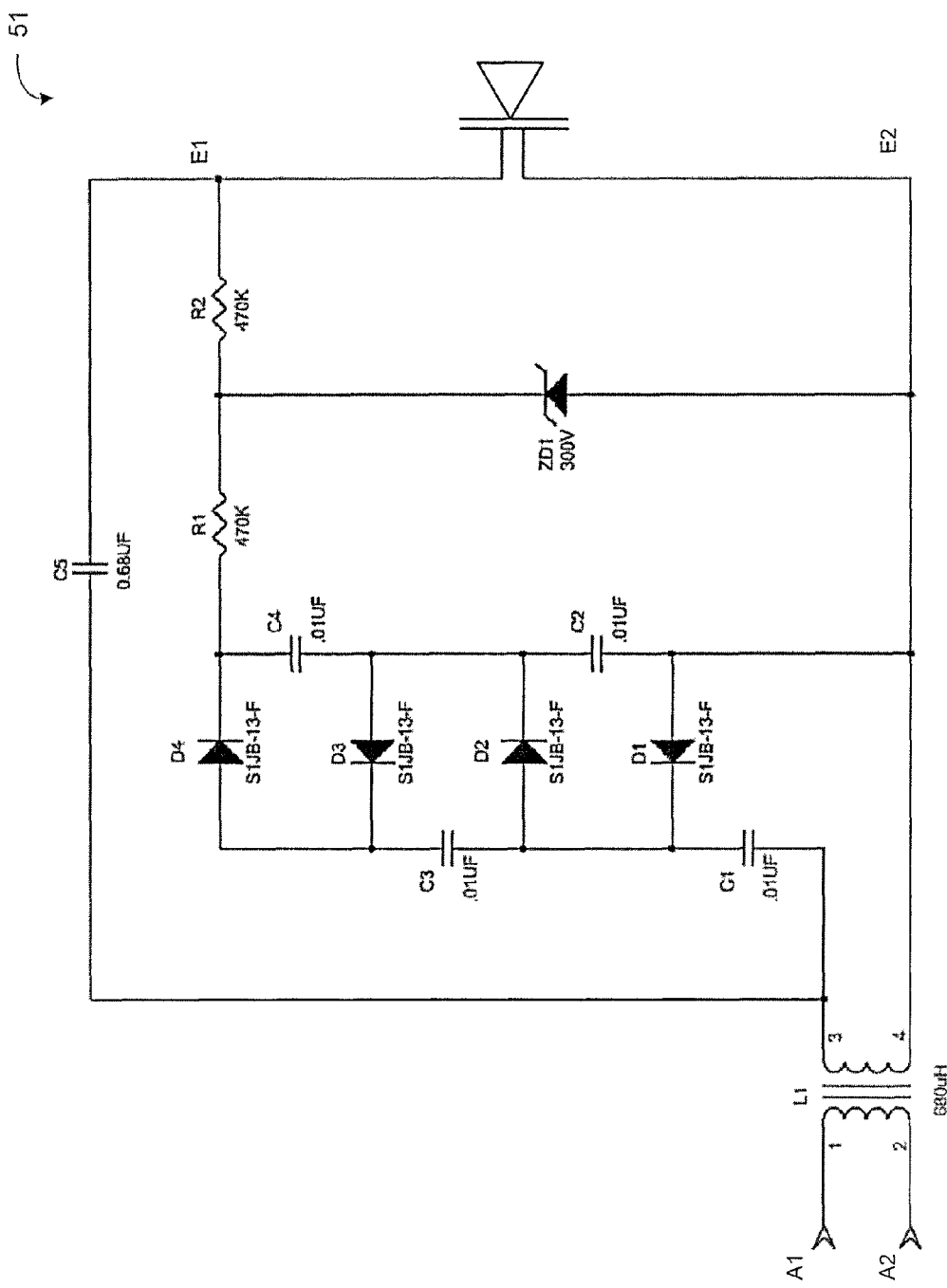
FIG. 9B is a diagram illustrating another example of a simple driver circuit that can be used to drive the emitters disclosed herein.

FIG. 9B is a diagram illustrating another example of a simple driver circuit that can be used to drive the emitters disclosed herein. As would be appreciated by one of ordinary skill in the art, where multiple emitters are used (e.g., for stereo applications), a driver circuit 51 can be provided for each emitter. In some embodiments, the driver circuit 51 is provided in the same housing or assembly as the emitter. In other embodiments, the driver circuit 51 is provided in a separate housing. This driver circuit is only an example, and one of ordinary skill in the art will appreciate that other driver circuits can be used with the emitter technology described herein.

Typically, the modulated signal from the signal processing system 10 is electronically coupled to an amplifier (not shown). The amplifier can be part of, and in the same housing or enclosure as driver circuit 51. Alternatively, the amplifier can be separately housed. After amplification, the signal is delivered to inputs A1, A2 of driver circuit 51. In the embodiments described herein, the emitter assembly includes an emitter that can be operable at ultrasonic frequencies. The emitter is connected to driver circuit 50 at contacts E1, E2. An advantage of the circuit shown in FIG. 9B is that the bias can be generated from the ultrasonic carrier signal, and a separate bias supply is not required. In operation, diodes D1-D4 in combination with capacitors C1-C4 are are configured to operate as rectifier and voltage multiplier. Particularly, diodes D1-D4 and capacitors C1-C4 are configured as a rectifier and voltage quadrupler resulting in a DC bias voltage of up to approximately four times the carrier voltage amplitude across nodes E1, E2. Other levels of voltage multiplication can be provided using similar, known voltage multiplication techniques.

Capacitor C5 is chosen large enough to hold the bias and present an open circuit to the DC voltage at E1 (i.e., to prevent the DC from shorting to ground), but small enough to allow the modulated ultrasonic carrier pass to the emitter. Resistors R1, R2 form a voltage divider, and in combination with Zener diode ZD1, limit the bias voltage to the desired level, which in the illustrated example is 300 Volts.

Inductor 54 can be of a variety of types known to those of ordinary skill in the art. However, inductors generate a magnetic field that can "leak" beyond the confines of the inductor. This field can interfere with the operation and/or response of the emitter. Also, many inductor/emitter pairs used in ultrasonic sound applications operate at voltages that generate large amounts of thermal energy. Heat can also negatively affect the performance of a parametric emitter.

For at least these reasons, in most conventional parametric sound systems the inductor is physically located a considerable distance from the emitter. While this solution addresses the issues outlined above, it adds another complication. The signal carried from the inductor to the emitter is can be a relatively high voltage (on the order of 160 V peak-to-peak or higher). As such, the wiring connecting the inductor to the emitter must be rated for high voltage applications. Also, long runs of the wiring may be necessary in certain installations, which can be both expensive and dangerous, and can also interfere with communication systems not related to the parametric emitter system.

The inductor 54 (including as a component as shown in the configuration of FIGS. 9A and 5B) can be implemented using a pot core inductor. A pot core inductor is housed within a pot core that is typically formed of a ferrite material. This confines the inductor windings and the magnetic field generated by the inductor. Typically, the pot core includes two ferrite halves 59a, 59b that define a cavity 61 within which the windings of the inductor can be disposed. See FIG. 10. An air gap G can be included to increase the permeability of the pot core without affecting the shielding capability of the core. Thus, by increasing the size of the air gap G, the permeability of the pot core is increased. However, increasing the air gap G also requires an increase in the number of turns in the inductor(s) held within the pot core in order to achieve a desired amount of inductance. Thus, an air gap can increase permeability and at the same time reduce heat generated by the pot core inductor, without compromising the shielding properties of the core.

In the example illustrated in FIGS. 9A and 9B, a dual-winding step-up transformer is used. However, the primary 55 and secondary 56 windings can be combined in what is commonly referred to as an autotransformer configuration. Either or both the primary and secondary windings can be contained within the pot core.

As discussed above, it is desirable to achieve a parallel resonant circuit with inductor 54 and the emitter. It is also desirable to match the impedance of the inductor/emitter pair with the impedance expected by the amplifier. This generally requires increasing the impedance of the inductor emitter pair. It may also be desirable to achieve these objectives while locating the inductor physically near the emitter. Therefore, in some embodiments, the air gap of the pot core is selected such that the number of turns in the primary winding 55 present the impedance load expected by the amplifier. In this way, each loop of the circuit can be tuned to operate at an increased efficiency level. Increasing the air gap in the pot core provides the ability to increase the number of turns in primary winding 55 without changing the desired inductance of inductor element 56 (which would otherwise affect the resonance in the emitter loop). This, in turn, provides the ability to adjust the number of turns in primary winding 55 to match the impedance load expected by the amplifier.

An additional benefit of increasing the size of the air gap is that the physical size of the pot core can be reduced. Accordingly, a smaller pot core transformer can be used while still providing the same inductance to create resonance with the emitter.

The use of a step-up transformer provides additional advantages to the present system. Because the transformer "steps-up" from the direction of the amplifier to the emitter, it necessarily "steps-down" from the direction of the emitter to the amplifier. Thus, any negative feedback that might otherwise travel from the inductor/emitter pair to the amplifier is reduced by the step-down process, thus minimizing the effect of any such event on the amplifier and the system in general (in particular, changes in the inductor/emitter pair that might affect the impedance load experienced by the amplifier are reduced).

In one embodiment, 30/46 enameled Litz wire is used for the primary and secondary windings. Litz wire comprises many thin wire strands, individually insulated and twisted or woven together. Litz wire uses a plurality of thin, individually insulated conductors in parallel. The diameter of the individual conductors is chosen to be less than a skin-depth at the operating frequency, so that the strands do not suffer an appreciable skin effect loss. Accordingly, Litz wire can allow better performance at higher frequencies.

Although not shown in the figures, where the bias voltage is high enough, arcing can occur between conductive layers 45, 46. This arcing can occur through the intermediate insulating layers as well as at the edges of the emitter (around the outer edges of the insulating layers. Accordingly, the insulating layer 47 can be made larger in length and width than conductive layers 45a, 46a, to prevent edge arcing. Likewise, where conductive layer 46 is a metalized film on an insulating substrate, conductive layer 46 can be made larger in length and width than conductive layer 45, to increase the distance from the edges of conductive layer 46 to the edges of conductive layer 45.

Resistor R1 can be included to lower or flatten the Q factor of the resonant circuit. Resistor R1 is not needed in all cases and air as a load will naturally lower the Q. Likewise, thinner Litz wire in inductor 54 can also lower the Q so the peak is not overly sharp.

FIG. 11 is an exploded view diagram of an emitter and a screen of an accompanying content device with which it is incorporated in accordance with one embodiment of the technology described herein. Referring now to FIG. 11, the emitter 6 in this example includes conductive sheets 45, 46 and an insulating layer 47 therebetween. This emitter can be configured in accordance with the various embodiments as described in this document, including embodiments that do not include insulating layer 47. For example, conductive sheets 45, 46 can be transparent sheets and can each include two layers, a conductive layer 45a, 46a and a base layer 45b, 46b. These separate layers are not shown in FIG. 11 for ease of illustration.

Also shown in FIG. 11, is a display screen 60 to which the emitter is applied. Display screen 60 can be, for example, the display screen of a content device such as, for example, laptops, tablet computers, computers and other computing devices, smartphones, televisions, PDAs, mobile devices, mp3 and video players, digital cameras, navigation systems, point-of-sale terminals and other, or other content display devices. In various embodiments, the emitter 6 can be assembled with display screen 60 during device manufacture. In other embodiments, emitter 6 can be affixed to or joined with display screen 60 after the content device has been manufactured. For example, emitter 6 can be provided as an aftermarket product to be added to the content device by the user or retailer. It yet further embodiments, display screen 60 can be provided with a conductive region (e.g., coating) and be used as the base layer of the emitter, eliminating the need for layer 45.

The emitter can be larger or smaller than the actual display area, depending on the content device and application. For example, in some content devices, a transparent screen is provided to form a cover plate over both the display area and the border surrounding the display area. Accordingly, with such applications, the emitter can be sized to conform to the dimensions of the cover plate, thus providing a larger emitter area.

In yet further embodiments, content device display screen 60 can be made using a conductive glass (or other transparent material) and display screen 60 can be used as the conductive sheet 45. More particularly, in some embodiments, display screen 60 is used as base layer 45b to which a conductive layer 45a is applied. In such embodiments, display screen 60 can be manufactured to include an appropriate terminal or contact point by which a signal lead can be attached to display screen 60. In still further embodiments, the emitter can be configured to be flexible enough to be implemented with a touch-screen content device. For example, where display screen 60 is a touchscreen, emitter 6 can be made using sufficiently flexible materials to allow a user to operate the touchscreen display underlying the emitter.

In further embodiments, the transparent emitter can be implemented as a touch screen display. For example, in embodiments in which acoustic pulse recognition technology is used to implement the emitter/display, a touch sensor module can be included to sense wave patterns in the display based on the position at which a user touches the display. The touch sensor module can include appropriate signal processing circuitry/algorithms to subtract vibrations due to the known modulated ultrasonic carrier from the sensed vibrations to determine a position on the display touched by the user. Similarly, for surface acoustic wave technology, the touch sensor module can include appropriate signal processing circuitry/algorithms to subtract effects of audio modulation on the ultrasonic carrier from the received signal to determine a position on the display touched by the user. As a final example, with capacitive touchscreen displays, a touch sensor module can be included and configured to subtract any effect on the capacitance of the emitter/display caused by the modulated ultrasonic signal from received signals to arrive at the capacitance changes caused by an operator touching the display.

Figure 12A:
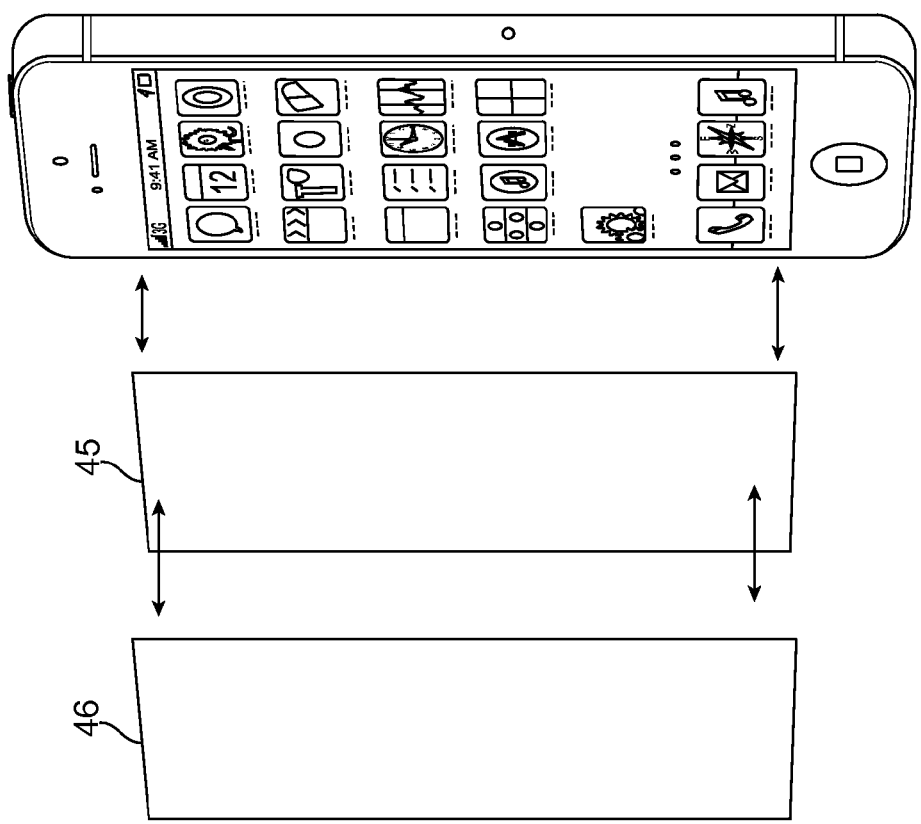
FIG. 12A is a diagram illustrating an example of an emitter (e.g., emitter 6) applied to the screen of a smart phone.

As described above, the emitters disclosed herein can be configured to be implemented with any of a number of different content devices. FIG. 12A is a diagram illustrating an example of an emitter (e.g., emitter 6) applied to the screen of a smart phone. In such an embodiment, the emitter can be used to play music and other media audio as well as to play ring tones, alarms, and other alerts generated by the smart phone and its associated applications. As with other devices, the emitter 6 can be used in addition to, or in place of, conventional audio speakers.

Figure 12B:
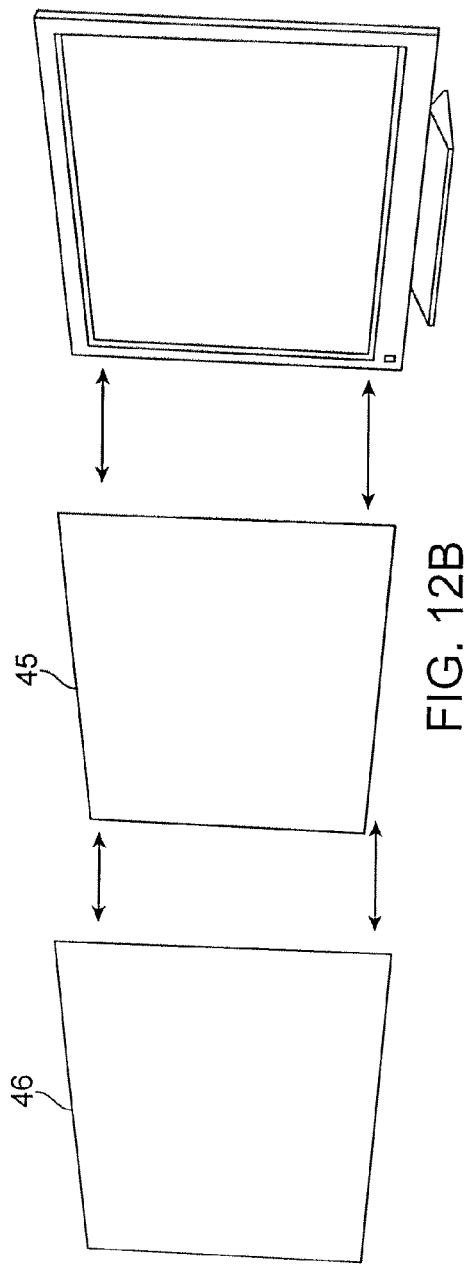
FIG. 12B is a diagram illustrating an example of an emitter (e.g., emitter 6) applied to the screen of a flat screen television.
Figure 12C:
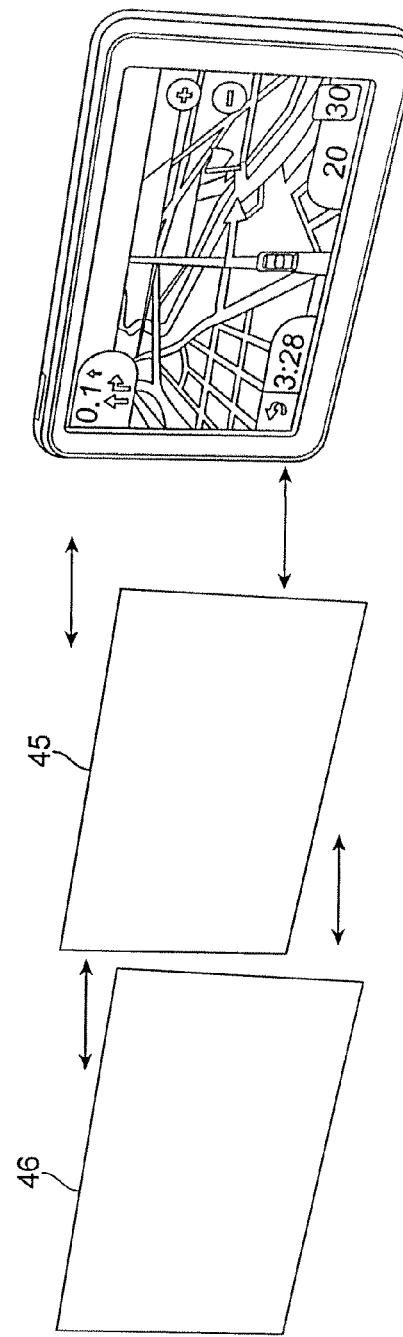
FIG. 12C is a diagram illustrating an example of an emitter (e.g., emitter 6) applied to the screen of a portable GPS device.

FIG. 12B is a diagram illustrating an example of an emitter (e.g., emitter 6) applied to the screen of a flat screen television. In such embodiments, the emitter can be configured to play content audio (e.g. television audio) to the television viewers. FIG. 12C is a diagram illustrating an example of an emitter (e.g., emitter 6) applied to the screen of a portable GPS device. In such applications, the emitter can be configured to play alerts and alarms the user as well as to provide audible turn-by-turn or other like instructions. Of course, where music or other content is available on the portable GPS device, emitter can be configured to play that information to the user as well.

Figure 12D:
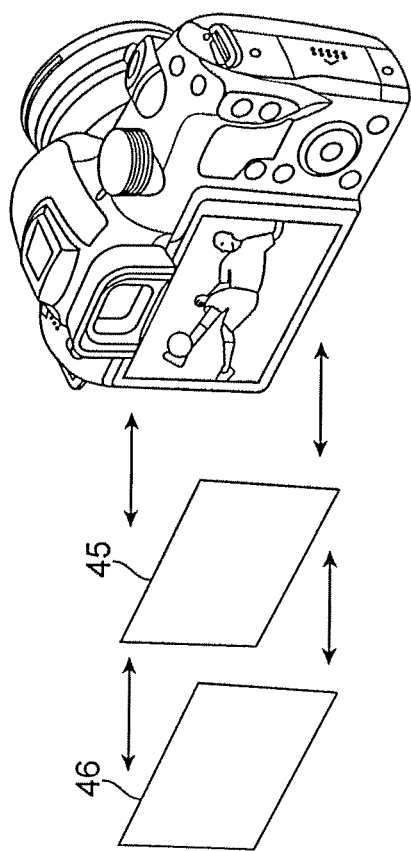
FIG. 12D is a diagram illustrating an example of an emitter (e.g., emitter 6) applied to the screen of a digital camera.
Figure 12E:
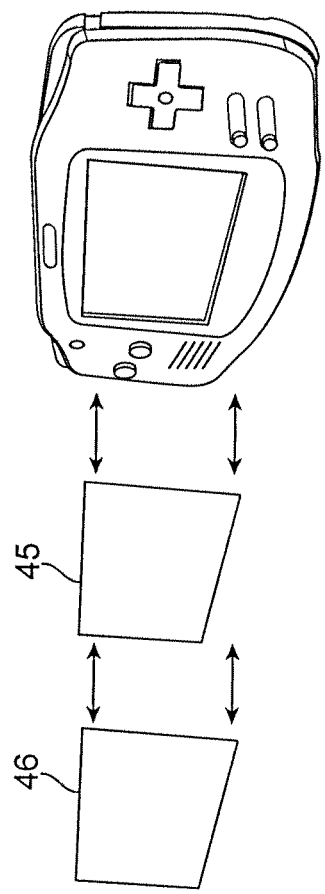
FIG. 12E is a diagram illustrating an example of an emitter (e.g., emitter 6) applied to the screen of a handheld gaming device.

FIG. 12C is a diagram illustrating an example of an emitter (e.g., emitter 6) applied to the screen of a portable navigation device. In such embodiments, the emitter can be configured to play back navigational directions and other sounds (e.g., turn by turn directions, chimes, alerts, low battery messages, and so on). FIG. 12D is a diagram illustrating an example of an emitter (e.g., emitter 6) applied to the screen of a digital camera. In such embodiments, the emitter can be configured to play back camera alerts and sounds (e.g., menu confirmations, simulated shutter sound effects, low battery messages, and so on). FIG. 12E is a diagram illustrating an example of an emitter (e.g., emitter 6) applied to the screen of a handheld gaming device. In such embodiments, the emitter can be configured to play gaming sounds to the user (e.g. game audio soundtracks, game sound effects, audible instructions, and so on) as well as gaming system alerts and messages.

Content devices, including those depicted in FIGS. 12A-12E can be configured to include one or more power supplies to supply power to the device and a content engine coupled to receive power from the power supply and to generate electrical signals representing audio content and electrical signals representing display content. For example, in the case of a smartphone, the power supply is typically in the form of a rechargeable battery and the content engine comprises a processor configured to execute one or more applications such as, for example, media player applications, gaming applications, telephone and directory applications, and so on. RAM, ROM and other memory can be included to store applications, application content (e.g., audio and video files), program instructions and so on. One such example processor is the Snapdragon™ family of processors available from Qualcomm, Inc.

The content display device typically also includes a display such as, for example, a plasma, LCD, LED, OLED or other display. The display can include a conventional screen or a touch-sensitive screen to accept user input and can provide color still and motion video content to the user. The display can be coupled to the content engine and configured to receive the electrical signals representing display content and to generate a visual representation of the display content. Continuing with the example of a smartphone, the display can display application visual information such as, for example, entry screens, video content, gaming screens, and so on. A protective cover can be included on the display and can be made from glass, acrylic, Plexiglas, Lexan or other transparent material. The transparent emitter can be disposed on the protective cover, for example, as an overlay on the protective cover. Alternatively, the emitter can be provided in place of the protective cover, or in place of the screen itself.

In these and other applications, the ultrasonic emitters can be configured to take advantage of the directional nature of ultrasonic signals, and can be configured to direct the ultrasonic audio content to an intended listener or user of the device. Accordingly, the device can be used in crowded or other public places with discretion. Emitters can also be shaped or configured to present a broader, less directional, sound to the listeners. This can be accomplished, for example, using a convex or multi-angled display.

Figure 13:
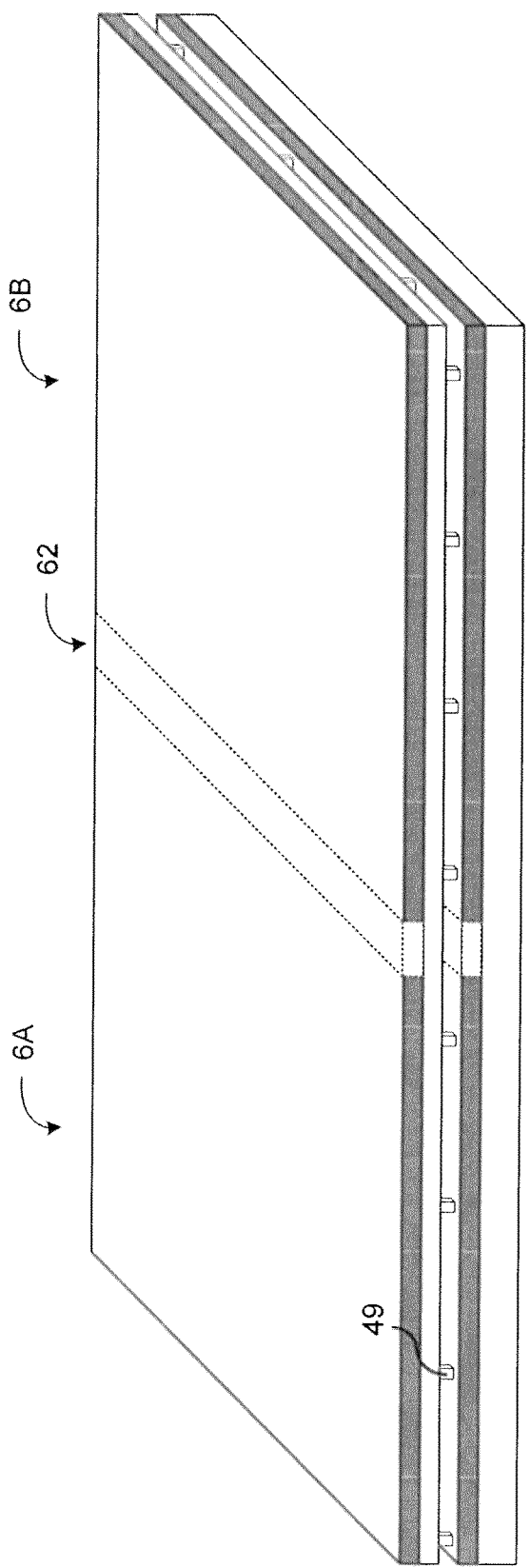
FIG. 13 is a diagram illustrating one example configuration of a dual-channel emitter configured to provide ultrasonic carrier audio for two audio channels.

In the embodiments described above, the emitter is depicted and described as providing ultrasonic-carrier audio signals for a single channel of audio. In other embodiments, the emitter can be configured to handle multiple audio channels. For example, in one embodiment, two separate emitters, each configured to be connected to an audio channel (e.g., a left and right audio channel) can be provided. FIG. 13 is a diagram illustrating one example configuration of a dual-channel emitter configured to provide ultrasonic carrier audio for two audio channels. In the example shown in FIG. 13, a left emitter 6A and a right emitter 6B are provided and separated by insulating barrier 62. Insulating barrier 62 provides a nonconductive region between the left and right emitters, electrically separating the left and right emitters so that the carriers injected on each emitter do not interfere with one another. In various embodiments, barrier 62 can be a nonconductive region of conductive layers 45a, 46a. In other embodiments, insulating region or barrier 62 can be a glass, acrylic, or other like insulating material positioned between the left and right emitters. Although two emitters 61A, 61B are illustrated in this example, one of ordinary skill in the art after reading this description will understand how more than two emitters can be created in a like fashion.

In other embodiments, rather than adding a physically separate insulating region between the 2 emitters, conductive sheets 45 and 46 can be manufactured with a nonconductive central region. For example, where doping or other like processes are used to impart conductivity to the conductive sheets, such doping or other process can be selectively applied to the sheets such that 2 or more conductive regions can be created in each conductive sheet.

To impart spatial characteristics to the audio signal, the emitters in such multi-emitter configurations can be positioned on a content device in such a way that they are oriented in different angles from one another to direct the audio-modulated ultrasonic carrier signal in different directions. Even for handheld content devices, only a small angle differential between the 2 emitters would be needed to direct one audio-modulated ultrasonic carrier signal to the listener's left ear and the other audio-modulated ultrasonic carrier signal to the listener's right ear.

The conductive and non-conductive layers that make up the various emitters disclosed herein can be made using flexible materials. For example, embodiments described herein use flexible metallized films to form conductive layers, and nonmetalized films to form resistive layers. Because of the flexible nature of these materials, they can be molded to form desired configurations and shapes.

Figure 15B:
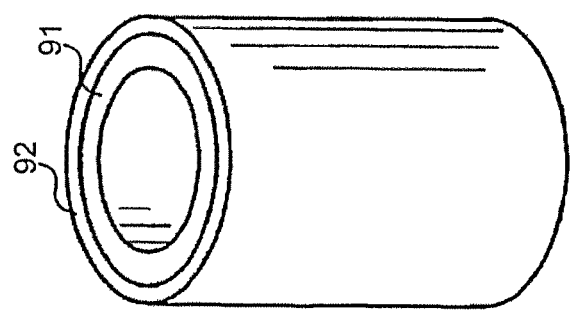
Figure 15A:
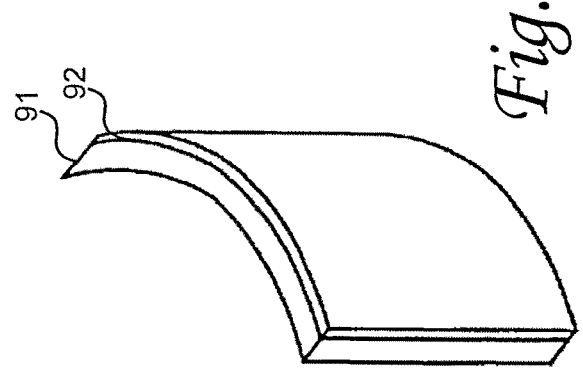

For example, as illustrated in FIG. 14A, the layers can be applied to a substrate 74 in an arcuate configuration. FIG. 15A provides a perspective view of an emitter formed in an arcuate configuration. In this example, a backing material 91 is molded or formed into an arcuate shape and the emitter layers 92 affixed thereto. Although one layer 92 is shown in FIGS. 15A, and 15B, layer 92 can comprise layers 45 and 46 and any spacers or insulators therebetween. Other examples include cylindrical (FIGS. 14B and 15B) and spherical, for example. As would be apparent to one of ordinary skill in the art after reading this description, other shapes of backing materials or substrates can be used on which to form ultrasonic emitters in accordance with the technology disclosed herein.

Conductive sheets 45, 46 can also be made using metalized films. These include, Mylar, Kapton and other like films. For example, in some embodiments, sheet 45 is made using a glass material and layer 46 is made using a metalized film such as mylar. Such metalized films are available in varying degrees of transparency from substantially fully transparent to opaque. Where oscillating layer (e.g., layer 46) is made using mylar or other like flexible film, it is ideally tensioned in both major dimensions so that it is capable of vibrating at carrier frequencies. Likewise, insulating layer 47 can be made using a transparent film. Accordingly, emitters disclosed herein can be made of transparent materials resulting in a transparent emitter. Such an emitter can be configured to be placed on various objects to form an ultrasonic speaker. For example, one or a pair (or more) of transparent emitters can be placed as a transparent film over a television screen. This can be advantageous because as televisions become thinner and thinner, there is less room available for large speakers. Layering the emitter(s) onto the television screen or other content or display device allows placement of speakers without requiring additional cabinet space. As another example, an emitter can be placed on a picture frame or electronic picture frame, converting a picture into an ultrasonic emitter. Also, because metalized films can also be highly reflective, the ultrasonic emitter can be made into a mirror.

The transparent emitter is also applicable to numerous other applications such as, for example, automobile mirrors or windows, dashboard panels, or other vehicle surfaces; doors and windows of appliances such as conventional ovens, microwave ovens, toaster ovens, dishwashers, refrigerators, etc.; desktop telephones; physical fitness or exercise equipment; display cases such as department store, supermarket, deli and other retail display cases; equipment screens on equipment such as oscilloscopes and other diagnostic or test equipment, medical devices, printers and faxes, and so on.

Because of the directional nature of ultrasonic transmissions, numerous devices so equipped may operate in proximity to one another, with their respective emitters directed at different listener positions, while not interfering with one another. Also, in various embodiments ultrasonic emitters can be used in combination with conventional audio speakers to allow the device to take advantage of the features of both ultrasonic audio (e.g., directionality) and conventional speakers (e.g., omnidirectionality). Switching can also be provided to allow the user or the system to select either the ultrasonic audio, the conventional audio or both.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An ultrasonic audio speaker, comprising:
a first transparent base layer;
a transparent conductor disposed on the first transparent base layer;
a second transparent base layer; and
a partially open transparent conductive layer disposed on the second transparent base layer between the first and second transparent base layers, wherein the partially open conductive layer comprises conductive portions, the conductive portions having a thickness and being arranged to define one or more open volumes adjacent the second transparent base layer.

2. The ultrasonic audio speaker according to claim 1, further comprising an insulating layer disposed between the first transparent base layer and the partially open conductive layer, and wherein the open volumes defined by the conductive portions are between the second transparent base layer and the insulating layer.

3. The ultrasonic audio speaker according to claim 1, further comprising a transparent conductive layer disposed between the second transparent base layer and the partially open conductive layer.

4. The ultrasonic audio speaker according to claim 1, wherein the open volumes defined by the conductive portions are further defined by a surface of the second transparent base layer and a facing surface of the first transparent base layer.

5. The ultrasonic audio speaker according to claim 1, wherein the partially open conductive layer comprises a wire mesh.

6. The ultrasonic audio speaker according to claim 5, wherein the wire mesh comprises a woven mesh of conductive wires.

7. The ultrasonic audio speaker according to claim 1, wherein the conductive portions of the partially open conductive layer comprises conductive filaments.

8. The ultrasonic audio speaker according to claim 1, wherein a diameter and spacing of the conductive portions of the partially open conductive layer are selected such that the partially open conductive layer has a transparency in the visible spectrum of greater than 80%.

9. The ultrasonic audio speaker according to claim 1, wherein the ultrasonic audio speaker has a resonant frequency and wherein the resonant frequency is defined by the quantity and volume of the open volumes in the partially open conductive layer.

10. The ultrasonic audio speaker according to claim 1, wherein the conductive portions of the partially open conductive layer comprises a plurality of sections of conductive wire arranged in an intersecting pattern defining open areas there between.

11. The ultrasonic audio speaker according to claim 1, wherein the conductive portions of the partially open conductive layer comprises a textured conductive member, the textured conductive member comprising a plurality of conductive ridges arranged so as to have openings there between.

12. The ultrasonic audio speaker according to claim 11, wherein the conductive ridges comprise a plurality of peaks defining valleys in the conductive ridges therebetween.

13. The ultrasonic audio speaker according to claim 1, wherein the transparent conductor disposed on the first transparent base layer comprises carbon nanowire.

14. The ultrasonic audio speaker according to claim 1, wherein the first and second transparent layers and the transparent conductor have a combined transmittance of greater than 80% in the visible spectrum.

15. An electronic content device, comprising:
a power supply;
a content engine coupled to receive power from the power supply and to generate electrical signals representing audio content and electrical signals representing display content;
a display coupled to the content engine and configured to receive the electrical signals representing display content and to generate a visual representation of the display content; and
a transparent ultrasonic carrier audio emitter disposed on the display, the emitter comprising:
a first transparent base layer;
a transparent conductor disposed on the first transparent base layer;
a second transparent base layer; and
a partially open transparent conductive layer disposed on the second transparent base layer between the first and second transparent base layers, wherein the partially open conductive layer comprises conductive portions, the conductive portions having a thickness and being arranged to define one or more open volumes adjacent the second transparent base layer.

16. The electronic content device according to claim 15, further comprising
a modulator coupled to receive the electrical signals representing audio content, and to modulate the received electrical signals onto an ultrasonic carrier; and
a driver circuit having two inputs configured to be coupled to receive the audio content modulated onto an ultrasonic carrier signal, and two outputs, wherein a first output is coupled to the transparent conductor and the second output is coupled to the partially open transparent conductive layer.

17. The electronic content device according to claim 15, wherein the transparent ultrasonic carrier audio emitter comprises a screen of the display.

18. The electronic content device according to claim 15, wherein the transparent ultrasonic carrier audio emitter further comprises an insulating layer disposed between the first transparent base layer and the partially open conductive layer, and wherein the open volumes defined by the conductive portions are between the second transparent base layer and the insulating layer.

19. The electronic content device according to claim 15, wherein the transparent ultrasonic carrier audio emitter further comprises a transparent conductive layer disposed between the second transparent base layer and the partially open conductive layer.

20. The electronic content device according to claim 15, wherein the open volumes defined by the conductive portions are further defined by a surface of the second transparent base layer and a facing surface of the first transparent base layer.

21. The electronic content device according to claim 15, wherein the partially open conductive layer comprises a wire mesh.

22. The electronic content device according to claim 15, wherein the conductive portions of the partially open conductive layer comprises conductive filaments.

23. The electronic content device according to claim 15, wherein a diameter and spacing of the conductive portions of the partially open conductive layer are selected such that the partially open conductive layer has a transparency in the visible spectrum of greater than 80%.

24. The electronic content device according to claim 15, wherein the transparent ultrasonic carrier audio emitter has a resonant frequency and wherein the resonant frequency is defined by the quantity and volume of the open volumes in the partially open conductive layer.

25. The electronic content device according to claim 15, wherein the conductive portions of the partially open conductive layer comprise a plurality of sections of conductive wire arranged in an intersecting pattern defining open areas there between.

26. The electronic content device according to claim 15, wherein the conductive portions of the partially open conductive layer comprise a textured conductive member, the textured conductive member comprising a plurality of conductive ridges arranged so as to create openings there between.

27. The electronic content device according to claim 26, wherein the conductive ridges comprise a plurality of peaks defining valleys in the conductive ridges therebetween.

28. The electronic content device according to claim 15, wherein the transparent conductor disposed on the first transparent base layer comprises carbon nanowire.

29. The electronic content device according to claim 15, wherein the first and second transparent layers and the transparent conductor have a combined transmittance of greater than 80% in the visible spectrum.

\* \* \* \* \*